(12) United States Patent
Jacobson

(10) Patent No.: US 8,206,470 B1
(45) Date of Patent: Jun. 26, 2012

(54) COMBUSTION EMISSION-REDUCING METHOD

(76) Inventor: William O. Jacobson, Las Flores, CA (US)

(*) Notice: Subject to any disclaimer, the term of this patent is extended or adjusted under 35 U.S.C. 154(b) by 998 days.

(21) Appl. No.: 11/496,704

(22) Filed: Jul. 31, 2006

Related U.S. Application Data

(60) Provisional application No. 60/705,027, filed on Aug. 3, 2005.

(51) Int. Cl.
*C10L 1/22* (2006.01)
*B01D 53/56* (2006.01)
*F02M 43/00* (2006.01)

(52) U.S. Cl. .......................... 44/387; 423/238; 123/304

(58) Field of Classification Search .................. None
See application file for complete search history.

(56) References Cited

U.S. PATENT DOCUMENTS

| | | | |
|---|---|---|---|
| 1,589,885 A | 6/1926 | Howard | |
| 3,352,716 A | 11/1967 | Lindstrom | |
| 3,449,063 A | 6/1969 | Griffing | |
| 3,599,427 A | 8/1971 | Jones | |
| 3,900,554 A | 8/1975 | Lyon | |
| 3,959,159 A | 5/1976 | Coleman | |
| 4,166,724 A | 9/1979 | Kanao | |
| 4,197,081 A * | 4/1980 | Osborg | 431/2 |
| 4,403,473 A | 9/1983 | Gladden | |
| 4,489,563 A | 12/1984 | Kalina | |
| 4,695,368 A | 9/1987 | Ward | |
| 4,750,453 A | 6/1988 | Valdespino | |
| 5,224,346 A | 7/1993 | Berriman et al. | |
| 5,234,477 A | 8/1993 | Gwyn | |
| 5,409,681 A | 4/1995 | Kato et al. | |
| 5,572,871 A | 11/1996 | Kalina | |
| 5,584,265 A | 12/1996 | Rao et al. | |
| 5,609,026 A | 3/1997 | Berriman et al. | |
| 5,813,224 A | 9/1998 | Rao et al. | |
| 5,836,361 A * | 11/1998 | Koncsek | 141/279 |
| 5,837,126 A | 11/1998 | Jessup et al. | |
| 6,019,068 A | 2/2000 | Tsuo et al. | |
| 6,155,212 A * | 12/2000 | McAlister | 123/3 |
| 6,290,734 B1 | 9/2001 | Scott et al. | |

(Continued)

FOREIGN PATENT DOCUMENTS

CA 2133572 10/1993

(Continued)

OTHER PUBLICATIONS

"Richard Nakka's Experimental Rocketry Web Site," p. 4 citing KIT & EVERED, "Rocket Propellant Handbook," 1960, @ http://www.nakka-rocketry.net/techref.html, see spec @ p. 11.

(Continued)

*Primary Examiner* — Melvin C Mayes
*Assistant Examiner* — Sheng H Davis

(57) ABSTRACT

In one embodiment, a fluid mixture composition is used at least in part as a fuel for engine-powered transportation vehicles, the mixture comprising an initial concentration of an ammonia-like reductant component and an initial concentration of an ammonia-like carrier component. The mixture may also include an optional third hydrocarbon component, e.g., gasoline or diesel fuel, with modified properties when compared to conventional gasolines or diesel fuels. The mixture is separated into a first and a second stream, with the majority of the first stream being used as a fuel for the engine and at least a first portion of the second stream being injected into the engine exhaust gases to reduce NOx emissions. A second portion of the second stream is aspirated into the engine and a lean air/fuel ratio may be used to improve fuel efficiency.

10 Claims, 2 Drawing Sheets

U.S. PATENT DOCUMENTS

| | | | |
|---|---|---|---|
| 6,655,324 B2 | 12/2003 | Cohn et al. | |
| 6,711,893 B2* | 3/2004 | Ueda et al. | 60/285 |
| 6,852,292 B2 | 2/2005 | Berriman et al. | |
| 6,949,235 B2* | 9/2005 | Brown et al. | 423/213.2 |
| 7,257,945 B2* | 8/2007 | Kass et al. | 60/286 |
| 2002/0028170 A1* | 3/2002 | Sudduth et al. | 423/235 |
| 2004/0088970 A1* | 5/2004 | Mulligan | 60/286 |
| 2004/0173450 A1* | 9/2004 | Fisher et al. | 204/164 |
| 2004/0187483 A1* | 9/2004 | Betta et al. | 60/286 |
| 2004/0209769 A1* | 10/2004 | Demel et al. | 502/220 |
| 2005/0129599 A1* | 6/2005 | Berriman et al. | 423/235 |
| 2005/0132674 A1* | 6/2005 | Toyoda et al. | 55/282.3 |

FOREIGN PATENT DOCUMENTS

| | | | |
|---|---|---|---|
| DE | 102005026036 | * | 6/2005 |
| JP | 61019940 | * | 1/1986 |

OTHER PUBLICATIONS

"General Table of Fuel Properties" at the Alternative Fuels Data Center website http://www.afdc.doe.gov/pdfs/fueltable.pdf, see spec @ p. 11.

Emission Reduction Technology for Diesel Backup Generators in CA, CEC, Dec. 2001, @ http://www.energy.ca.gov/pier/final project reports/500-01-028.html, see spec @ p. 18 Executive Summary.

abstract of "Aftertreatment of a Lean-Burn Natural Gas Engine," Engine Technology Progress in Japan, SKU 11998046, @ http://www.itepsa.com/Detail.bok?no=380, see spec @ p. 18.

Lee, et al., "Estimation of Air Fuel Ratio of a SI Engine from Exhaust Gas Teperature at Cold Start Condition," SAE 2002-01-1667, 2002.

Steele, "A proposal for an ammonia econmoy," Chemtech Aug. 1999.

Mackenzie, et al, "Ammonia Fuel: The Key to Hydrogen-Based Transportation," IEEE, 96556, 1996.

T-Raissi, "Technoecomomic Analysis of Area ii Hydrogen Production—Part ii Hydrogen from Ammonia and Ammonia-Borane Complex fo Fuel Cell Applications," 2001.

Proceeding of the 2002 U.S. DOE Hydrogen Program Review, NREL/CP-510-32405.

Van Blarigan, "Advanced Internal Combustion Engine Research," Proceeding of the 2000 U.S. DOE Hydrogen Program Review, NREL/CP-570-28890.

Owen et al., "Automotive Fuels Reference Book," SAE, 1995, p. 96.

Pohl, NOx Reduction in the UCLA Boiler Using NH3 Injection, Energy Internations, Mar. 1994.

Pohl, "Limits to NOx reduction by NH3 Injection," Meeting American Chemical Society, Div of Fuel Chemistry, Mar. 28-Apr. 2, 1993.

Thomas, "Fuel-Borne Reductants for NOx Aftertreatment: Preliminary EtOH SCR Study," Oak Ridge Nat Lab, Diesel Engine Emissions Reduction Workshop, Aug. 28, 2003.

Thomas, et al., "Silver Alumina Catalyst Performance with Light Alcohols and Other Reductants," Proceedings: 2004 DEER Conference, DOE, Coronodo, CA Aug. 29-Sep. 2, 2004.

Exergy, Inc., "The Kalina Cycle Bottoming Cycle fo Diesel Combined Cycle," May 15, 2001, Hayward CA.

Environmental News Network, "Catalytic converters fix one pollution problem, cause another," Nov. 27, 2000IEEE, 96556, 1996.

Suppes, "Past Mistakes and Future Oppotunities of Ethanol in Diesel," Northeast Regional Biomass Program, Univ of Kansas.

Bell, "The Electrical Energy of Dipole Molecules in Solution, & the Solubilites of Ammonia, HCl, & Hydrogen Sulphide in Various Solvents" J. Chem Soc., 1931, pp. 1371-1382.

Cady et al., "the Fusion for the Systems Ammonia-Propyl Alcohols and Ammonia-Butyl Alcohols," J. Phys. Chem., 1933, vol. 37, pp. 303-320.

Wilson et al., "Comprehensive Analytical Chemistry," vol. 1c, Elsevier Press (1962), IX, pp. 203.

Tavakkol, et al., "Gas Chromatographic Analysis of Bacterial Amines as Their Free Bases," J of Chromatography, 1983, vol. 274, pp. 37-44.

Mohnke et al., "Application of fused-silica column to the determination of vary volatile amines by gas-solid chromatography," J of Chromatography, 1994, v 667, pp. 334-339.

Short et al., "Solubility of Ammonia and Hydrogen Sulfide in Several Polar Solvents," J. Chem. Eng. Data 1983, vol. 28, pp. 63-66.

Messow et al., "Comparison Between Observed and Calculated Solubilities of Gases in Oil Fractions," Polish Journal of Chemistry, vol. 54, 1980, pp. 2001-2009.

Zanker, "Inorganic Gases in Petroleum," Hydrocarbon Processing, vol. 56, 1977, pp. 255-256.

* cited by examiner

COMBUSTION EMISSION-REDUCING METHOD

CLAIM FOR PRIORITY

Incorporation by Reference

This application claims priority from a co-pending Provisional Patent Application No. 60/705,027, filed on Aug. 3, 2005, by William O. Jacobson, Las Flores, Calif., Applicant. All U.S. patents, prior filed patent applications, and any other published documents and printed matter cited or referred to in this application are incorporated in their entirety herein by reference.

FIELD OF THE INVENTION

This invention relates to emission-reducing fuel compositions, fuel handling, engines and other power-producing apparatus, engine-exhaust gas treatment, and/or related apparatus and methods. More specifically in one embodiment, the invention relates to modifications to a baseline gasoline-fueled automobile using a new fuel mixture that reduces at least some unwanted engine exhaust emissions when compared to the baseline gasoline-fueled automobile using a baseline fuel.

BACKGROUND OF THE INVENTION

One of the significant environmental problems confronting the United States today is undesirable exhaust emissions from combustion engines and related apparatus, especially vehicle emissions from gasoline-fueled automobiles and diesel-fueled trucks using internal combustion (IC) engines. Although significant reductions in some vehicle emissions have been achieved in the past, further reductions are still currently being sought. One especially difficult portion of the emissions problem is generally recognized to be the emission of so-called greenhouse combustion gases, e.g., $CO_2$ from diesel and gasoline-fueled vehicles. Another problem is generally recognized to be the emission of excessive amounts of nitrous and other nitrogen oxides (NOx) emissions, especially from diesel-powered vehicles.

One of the objects of the invention is to increase fuel efficiency and reduce IC engine emissions of one or more of the following exhaust emissions: carbon dioxide ($CO_2$); carbon monoxide (CO); nitrogen oxides (NOx); particulate matter (PM); and unburned and/or volatile hydrocarbons (VOC and/or gaseous HC).

SUMMARY OF THE INVENTION

In one composition embodiment for at least in part fueling a combustion engine-powered vehicle, a fluid mixture comprises an ammonia-like reductant component and a significant concentration of an ammonia-like carrier component that also functions as a combustion fuel. Instead of separately storing urea or other NOx reductants, the carrier component allows the convenient storage of the ammonia-like component not typically available in a vehicle application, e.g., allowing ammonia to be stripped off and injected into the engine exhaust gases to reduce NOx emissions. The inventive composition may also comprise an optional third component, e.g., gasoline, diesel fuel or another hydrocarbon (HC) component, and still other optional components such as fuel additives.

In one process embodiment, the reductant mixture is separated into generally liquid and vapor portions. The vapor portion typically has an enhanced concentration of the ammonia-like component and the liquid portion has an enhanced concentration of the ammonia-like carrier component. The process uses at least some of the generally liquid portion as a combustion engine fuel and at least some of the generally vapor portion as a NOx reductant that is injected into and mixed with combustion engine exhaust gases.

In one apparatus embodiment, portions of an inventive vehicle (e.g., including an IC engine, transmission, chassis, and body) are generally similar to conventional spark-ignition (or Otto-cycle) or Diesel-cycle powered vehicles. Portions that are not generally similar to a conventional or baseline vehicle typically include a separator of generally liquid and reductant-enhanced vapor portions of an inventive mixture, an optional means for pressurizing a vapor portion, and an exhaust-gas/vapor-portion mixer. In order to improve fuel efficiency, means for aspirating some of the vapor portion and/or increasing air/fuel ratios may also be included.

In one preferred initial fuel-reductant composition for vehicles powered by an Otto-cycle (i.e., a four-cycle spark-ignition) engine, the composition has a range of about 0.01% to about 0.5% by weight of ammonia, about 10-20% by weight of ethanol, and about 80-90% by weight of a gasoline-type mixture of hydrocarbons. In a preferred process using a preferred initial composition, a generally liquid stream is withdrawn from a lower portion of a vehicle fuel tank and a generally vapor stream portion, e.g., an ammonia-enriched vapor stream drawn from an upper portion of the vehicle fuel tank. At least a first portion of the generally vapor stream is mixed with combustion gases in the exhaust system of the vehicle, acting as a NOx reductant in the exhaust gas stream. A second portion of the vapor stream may be aspirated into the IC engine. The pressure of the first vapor stream portion may be raised (e.g., using a compressor to a few psig) if required to overcome exhaust system pressures.

In an apparatus embodiment using another fuel-reductant composition having a concentration of at least about 5 percent by weight of a first or reductant component, at least some of the separated, generally vapor stream used as a fuel for a fuel cell, preferably an alkaline fuel cell. At least some of a separated, generally liquid stream separated from the fuel-reductant composition is combusted in an internal-combustion (IC), Otto-cycle engine. The reductant concentration of the composition serves as a kind of hydrogen storage device, e.g., storage in the form of a 10% ammonia concentration, to further reduce the amount of one or more undesirable exhaust gases emitted from the vehicle when compared to the exhaust emissions from a baseline vehicle using a baseline IC engine combusting a baseline motor gasoline.

DETAILED DESCRIPTION OF THE INVENTION

Figure 1:
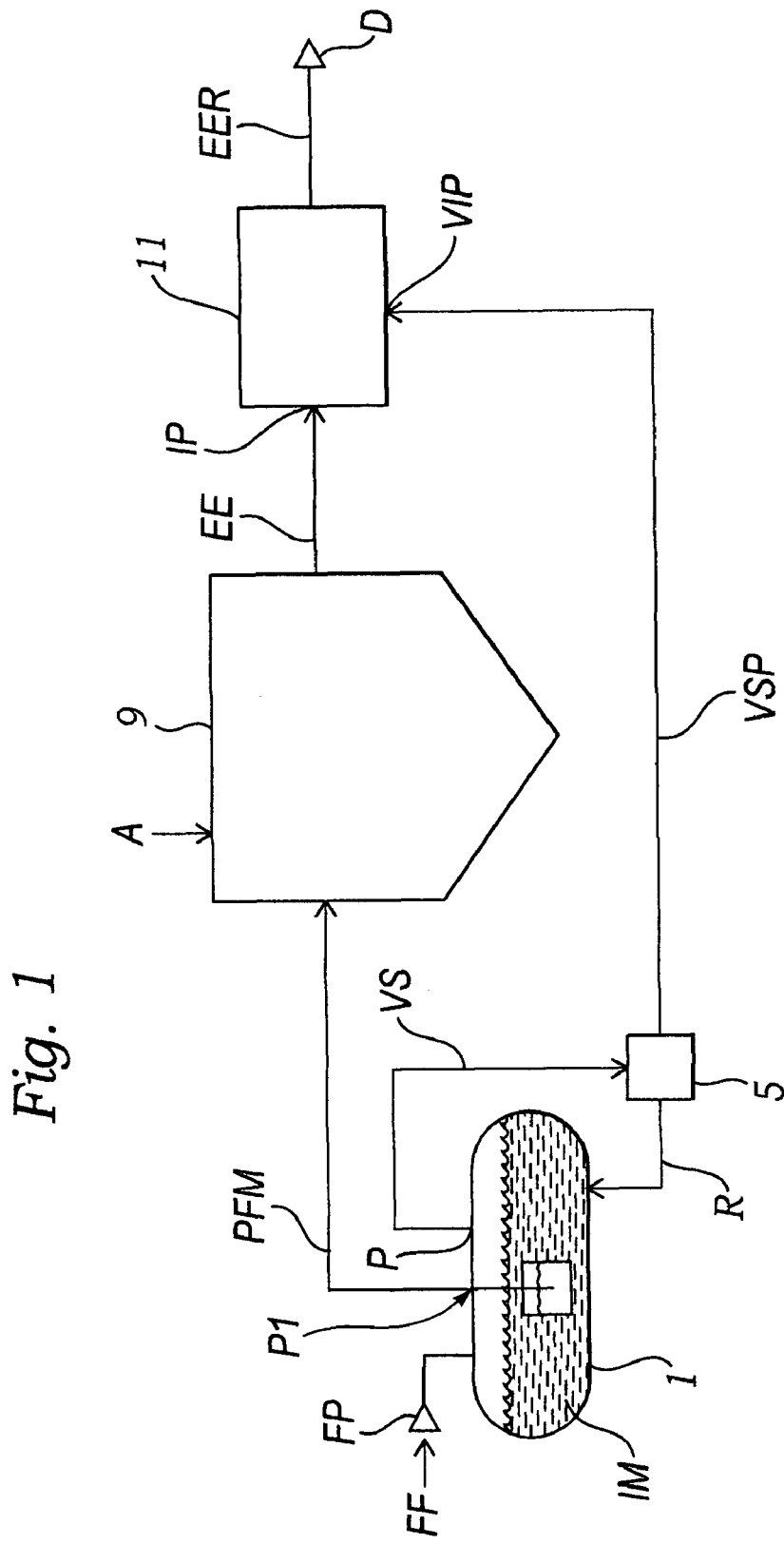
FIG. 1 shows a schematic representation of a relatively simple inventive apparatus using an inventive mixture.

One composition mixture embodiment of the present invention is a fluid mixture for use primarily as a fuel in highway and other transportation vehicles. The composition mixture is preferably separated on-board a vehicle with one separated portion at least in part used as a fuel for a combustion engine, especially as a fuel suitable for IC engine-driven vehicles such as nominally gasoline-powered automobiles or diesel-powered buses and trucks. A second separated portion is, at least in part, preferably used as a NOx reductant mixed with exhaust gases.

The composition of the inventive mixture comprises at least two components, a first reductant component comprising at least 0.01 percent by weight of the inventive mixture and selected from a group of compounds having hydrogen and nitrogen elements (preferably having less than 30 percent by weight of carbon, more preferably in the absence of carbon, e.g., ammonia and/or hydrazine), a second component that carries, more preferably dissolves a range of first component concentrations, e.g., ethanol, methanol, and/or other alcohols that can dissolve a wide range of ammonia concentrations. An optional third component (with the second component now acting as a co-solvent for the first & third components) is a fluid or fluid-like hydrocarbon compound, e.g., a mixture primarily composed of hydrocarbon molecules. Preferred initial compositions are expected to be limited to about 5-20% alcohol (as the second component) and less than about 2% ammonia (as the first component) by wt. with a third HC component comprising most if not all of the remainder of the inventive mixture. This preferred initial composition is based on a desire to have initial compositions useable in many existing vehicles and solubility data for some three-component mixtures.

Solubility data for ammonia in about 15-20% t-butanol/80-85% gasoline mixture blends at approximately room temperatures showed low levels of solubility of ammonia. More specifically, up to about 0.07% ammonia was capable of being dissolved in these t-butanol/gasoline mixtures. About 0.5% ammonia by wt. was capable of being dissolved in commercially pure t-butanol.

Solubility data for ammonia in about 15-20% methanol/80-85% gasoline mixture at approximately room temperatures resulted in two liquid phases forming. The ammonia solubility capability in an upper phase gasoline/methanol mixture was about 3% ammonia by weight. About 18% ammonia was dissolved in a commercially pure methanol upper phase. In the lower liquid phase mixture (about 10% of the two liquid phases by volume), the ammonia solubility in a gasoline/methanol mixture was about 6% by weight. About 18% ammonia by weight was capable of being dissolved in commercially pure methanol lower liquid phase.

Solubility data for ammonia in about 15-20% ethanol/80-85% gasoline mixture (at nominal room temperature conditions) resulted in only one liquid phase and an ammonia solubility of about 1.4% by weight in the gasoline/ethanol mixture. About 9.4% by weight of ammonia was capable of being dissolved in commercially pure ethanol.

In an embodiment with significant amounts of first and second components with a gasoline-type mixture as an optional third component, the third component may have at least two of the following properties: a Reid Vapor Pressure of less than 7.0 psi (preferably less than 6.8 psi, more preferably less than 6.5, and still more preferably less than 6.0 psi); an initial boiling point of at least about 90° F. (preferably at least about 95° F., more preferably at least about 100° F., and still more preferably at least about 105° F.); a 10% ASTM D-86 distillation point of at least about 100° F. (preferably at least about 105° F., more preferably at least about 110° F., and still more preferably at least about 115° F.); a 50% ASTM D-86 distillation point of at least about 200° F. (preferably at least about 205° F., more preferably at least about 210° F., and still more preferably at least about 215° F.); an aromatics content of no more than 35% by volume (preferably less than about 30% by volume, and more preferably less than about 25% by volume); and an (R+M)/2 octane rating of less than 87, (preferably less than about 86.7, more preferably less than about 86.4, and still more preferably less than about 86). These preferred, sometimes unusual properties of the third component (unusual if the third component were attempted to be used by itself as a conventional automotive fuel) are compensated for by the presence of the first and second components that tend to increase vapor pressure, increase distillation temperatures (especially initial boiling point), and increase octane ratings of the resulting inventive mixture.

Similarly for another mixture embodiment where the optional third component is a diesel-type mixture of hydrocarbons, the third component may have at least one of the following properties: a cetane number of at least 40, (preferably at least 43, more preferably at least 45, and still more preferably at least 50 as measured by ASTM D613 or similar method); a cloud point (° C.) of no more than +4, (preferably no more than +2 and more preferably no more than about +1 as measured by ASTM D5773 or similar method); a minimum viscosity (measured as mm per second at 40° C.) of 1.5 preferably a minimum viscosity of 2.0, more preferably, a minimum viscosity of 2.5, and still more preferably, a minimum viscosity of 3.0 as measured by ASTM D445 or similar method; and a T95 (95% of volume recovered at listed ° C.) of no more than 380 (preferably no more than 370, more preferably no more than 360, and still more preferably no more than 355).

For Diesel cycle engine applications, concentrations of alcohol and ammonia or similar first and second components are initially preferred to be small, possibly smaller than initial concentrations for Otto cycle engine applications, e.g., less than about 10% alcohol (more preferably about 5% alcohol or less) and less than about 0.4% ammonia, more preferably about 0.2% ammonia or less. These preferences are based on factors that may include one or more of the following: fuel property handling limitations (e.g., limits on vapor pressure) in current vehicles, A/F ratio control limitations in some vehicles, and cetane number depression resulting from alcohol and/or ammonia addition. However, the addition of the initially small concentrations of alcohol and/or ammonia, especially after removal of a vapor-phase stream leaving the generally liquid phase to be combusted with a reduced ammonia concentration, can reduce NOx and/or other emissions. Larger concentrations of ammonia and alcohol may require addressing some of the factors listed above, e.g., using a winter-grade diesel fuel as a third component and/or modifications to current fuel handling apparatus.

Although some composition embodiments of the inventive mixture can be used in a variety of combustion apparatus applications (e.g., in stationary engines, airplane and ship engines), some preferred composition embodiments are most suitable for automobiles powered by a spark-induced, reciprocating, internal combustion engine similar to those currently fueled by widely available, motor gasoline mixtures, e.g., blended hydrocarbon refinery stream mixtures, blended hydrocarbon/ethanol mixtures and blended hydrocarbon/MTBE mixtures. Hydrocarbon(s) are herein defined as materials mostly composed of hydrogen and carbon elements by weight, but may include minor amounts of other elements such as oxygen, nitrogen, or sulfur, e.g., generally less than 100 PPM of some other elements. It will also be understood by those skilled in the art that these mixtures may also contain other components, e.g., fuel system cleaner additives.

A combustion or an air-consuming combustion engine is defined herein as a power output device supplied with a suitable fuel mixture that reacts primarily with air to produce expandable hot gases from which power is extracted, the definition specifically excluding fuel cells or other devices that extract power from a chemical reaction primarily in the form of an electric current. An internal combustion (IC) engine is defined herein as a power output device in which a combustible material is combusted within an enclosed space or combustion chamber and the gases thus developed are expanded producing work, then exhausted from the combustion chamber. A transportation vehicle is defined herein as a earth-bound transportation device powered by a power-producing device such as a combustion engine, e.g., the definition excludes spacecraft engines or rockets such as those designed to operate outside the earth's atmosphere. However, at least portions of the inventive mixture may also be used in other types of vehicles, more specifically in non-combustion types of power sources, e.g., by separating an ammonia-enriched stream to be used primarily in non-combustion applications such as a fuel cell. In addition, the inventive fuel can be used in combined cycle applications, e.g., where at least a portion of the mixture is used in a fuel cell producing primarily an electric current and at least some elevated-temperature gases which can be used in a Brayton or other bottoming cycle engine to produce additional power.

One inventive fluid mixture preferably comprises a first component consisting essentially of nitrogen and hydrogen elements and a second carrier component for dissolving or otherwise carrying the first component. Another preferred composition for the first component comprises nitrogen and hydrogen elements with only minor amounts of a carbon element. As defined herein, minor carbon amounts shall be defined as less than 50 percent by weight, preferably less than 30% by weight, more preferably less than 15% by weight, even more preferably less than about 10% by weight, still more preferably less than 5% by weight, and most preferably in the substantial absence of carbon by weight. Ammonia as the first component dissolved in an alcohol or other second component is a preferred example of an inventive fluid mixture for reducing combustion emissions. Gasoline, diesel, or other hydrocarbon fuel may be an optional third component. Although the concentration of the first or reductant component is typically the smallest of a two or three primary component mixture, the reductant component comprises a significant weight fraction of the total mixture, e.g., the first component of the inventive mixture comprising at least about 0.01% by weight, preferably at least about 0.05%, more preferably at least about 0.1%, and still more preferably at least about 0.2% by weight. The inventive mixture is typically separated into at least two streams or portions; each stream used differently an overall inventive process. Typically, the concentration of the first component in a first separated stream is different than the concentration of the first component in a second separated stream, but both stream portions will typically include some amount of the first component.

Anhydrous ammonia is a gas at typical room temperature & pressure conditions with a boiling point of about −28° F. (or about −33° C.), but is typically commercially stored and transported as a pressurized liquid at ambient temperatures. For some uses, ammonia is mixed with water (i.e., as ammonium hydroxide) and transported as a liquid at some typical ambient temperature & pressure conditions. Anhydrous ammonia and ammonia-water mixtures have many commercial uses and ammonia is one of the most widely produced chemicals in the world. Ammonia and/or ammonia mixtures uses include refrigeration working fluids, plastics and dye manufacturing, and wide uses in agricultural applications as a fertilizer and/or insecticide.

Although large quantities of ammonia and ammonia mixtures are widely and safely stored, transported, and used commercially, ammonia is flammable in air and exposure to ammonia in sufficient quantities is known to be toxic. However, commercial suppliers and users of ammonia have generally developed equipment and process technologies to safely handle and transport widely varying amounts of ammonia.

Although the domestic cost of anhydrous ammonia has varied widely, prior U.S. wholesale costs have generally been about $1 per gallon or less (as a pressurized liquid at room temperatures). These prices suggest that the cost of using ammonia as a significant combustion fuel component of the inventive mixture is economically competitive with current diesel, gasoline, gasohol, or similar fuel mixtures. In addition, the long-established manufacturing and distribution infrastructures for existing commercial uses of ammonia, alcohol & gasoline are expected to result in a less costly transition to commercial uses of the inventive mixture when compared to some other alternative fuels.

Although ammonia is known to have an auto-ignition temperature, is known to burn in air within upper and lower concentration limits, can be explosive when within narrower concentration limits in air, and has been considered for use as a rocket fuel (e.g., see pages 4-5 of "Richard Nakka's Experimental Rocketry Web Site" citing "Rocket Propellant Handbook" by Kit & Evered, 1960), ammonia is not always considered to be an alternative fuel for vehicles, e.g., see the three-page "General Table of Fuel Properties" at DOE's Alternative Fuels Data Center website. The main products of ammonia combustion in air (e.g., at/or above 780 deg C.) are nitrogen and water, possibly with small amounts of nitrogen dioxide and ammonium nitrate depending upon factors such as combustion temperature and/or the presence of other combustible materials.

Energy density and specific gravity of a fuel or fuel mixture component such as ammonia may also be an important factor when the fuel is being considered for use in engine-driven vehicles. Although the ammonia component of the inventive mixture is mixed or dissolved in another fluid, for comparison purposes, liquefied ammonia under pressure at room temperature has a specific gravity of about 0.6 (where water is about =1) and that is somewhat less than gasoline but comparable to ethanol currently mixed with gasoline as a fuel component for some automotive applications. The energy density of liquid ammonia is somewhat similar to some alcohols such as methanol. When dissolved ammonia and alcohol are used as the first and second components of the inventive mixture and combined with substantial amounts of a hydrocarbon fuel as an optional third component, these and other mixture properties indicate that vehicle range and performance comparable to current gasoline-ethanol mixtures is achievable with an acceptable size and weight of onboard vehicle fuel storage.

Another important property of anhydrous ammonia is its boiling point at atmospheric pressure of about −28° F. When ammonia is dissolved in a carrier fluid, the boiling point of the mixture is typically not the same as either component. However at some temperatures, the concentration of ammonia in the vapor phase above a liquid phase is generally greater than the concentration of ammonia in the liquid phase of the inventive mixture, i.e., the vapor phase is generally ammonia-enhanced and the liquid phase is ammonia-lean for embodiments using ammonia as the first component. Further condensing/distilling of the ammonia-enhanced vapors (e.g., with removal of condensed fluids) or other means for purifying can further enhance or increase the ammonia concentration in the remaining vapor phase.

Before the start of WWI, much of the supply of commercial ammonia was obtained by the dry distillation of nitrogenous vegetable and animal products; by the reduction of nitrous acid and nitrites with nascent hydrogen; and/or by the decomposition of ammonium salts by alkaline hydroxides or unslaked lime (quicklime), the salt most generally used being the chloride (sal-ammoniac). Ammonia was also obtained by decomposing magnesium nitride ($Mg_3N_2$) with water.

More recently, the major method of ammonia production in the U.S. is the Haber process. Ammonia can be obtained as a byproduct of the destructive distillation of coal or using natural gas and water. Other potential materials used to produce ammonia include animal waste products and urea. Ammonia may also be produced (or fluid mixture concentrations further enhanced) by synthetic production, e.g., by a cyanamide process or by contacting a metal nitride with water. Since ammonia is a significant component of some inventive mixtures, widespread use of some of the above-mentioned source materials for producing ammonia can reduce the current dependence of the U.S. on imported oil or gasoline and increase domestic fuel security.

Although larger mixture concentrations of a first component such as ammonia or other ammonia-like materials are possible, a maximum of about 30% by weight concentration of the first component is preferred, e.g., at least a portion of the remainder being components such as hydrocarbons with higher energy densities. In addition, some three-component mixtures (e.g., with larger first component concentrations) may not be a homogenous single-phase mixture, e.g., emulsifiers or agitation or separate withdrawal of layered fluids in a storage vessel may be required.

At least initially, more preferable ammonia concentrations of less than about 5 percent, still more preferably less than about 1 percent and still further more preferably less than about 0.6 percent by weight of ammonia are more likely to be initially present in an inventive mixture for some Otto cycle engine applications, especially if the objective is to allow the use of these inventive mixtures as a fuel for existing Otto-cycle powered automobiles with little or no vehicle modifications. However, initial ammonia or other first component concentrations are expected to be significant (i.e., at least about 0.01% by weight), e.g., in order to obtain significant emission benefits when used with modified and/or substantially unmodified vehicles.

If a primary objective is to supply only an ammonia-enriched stream to an exhaust gas stream in a process for somewhat reducing NOx emissions, an ammonia concentration near the low end of the anticipated range is initially preferred, preferably less than about 2% ammonia concentration by wt., more preferably less than about 1%. This ammonia limitation avoids some substantial modifications to vehicles to use the inventive compositions since the preferred ammonia concentrations are low and the separated liquid stream concentrations are even lower. In addition, inventive compositions having these limited ammonia contents are expected to be usable in many conventional vehicles. However, for example, if some reductions in $CO_2$ emissions are also desired, ammonia concentrations of at least about 2% by weight, more preferably at least about 3%, and still more preferably at least about 5% by wt. is expected which is also expected to increased ammonia concentrations in the liquid stream being combusted. With an increasing desire to control more substantial amounts $CO_2$ and CO emissions, larger concentrations of ammonia in the mixture may become more preferable, e.g., concentrations by weight of ammonia in an inventive mixture of at least about 6%, more preferably at least about at least about 8%, and still more preferably at least about 10%.

Although ammonia has been described as the first component in one preferred embodiment of an inventive mixture, the first component may be selected from a group consisting of ammonia-like materials or other combustible/oxidizable matter containing hydrogen with carbon comprising no more than 30% by weight of the first component, preferably no more than 20%, more preferably no more than 10%, and still more preferably no more than about 5% by weight. The first component is also typically a NOx reducing agent (i.e., reductant) when injected into a combustion exhaust stream. An ammonia-like first component typically comprises at least one compound or molecule having nitrogen-hydrogen bonds, preferably in the absence of substantial amounts of carbon especially when reducing $CO_2$ is a major goal. Besides ammonia, other possible ammonia-like first components of the inventive mixture include: urea, hydrazine, and azoimide. Other components having minor amounts of other elements (besides hydrogen and nitrogen) such as oxygen may also be used as the ammonia-like component, e.g., unsymmetrical dimethyl hydrazine or UDMH. It will be understood by those skilled in the art that the first component may also be a mixture of several fluids, e.g., with nitrogen and hydrogen containing molecules having little or no carbon content.

Since one of the objectives of the inventive mixture may be to reduce one or more of the carbon-containing exhaust emissions (e.g., $CO_2$ and CO) from Otto cycle engines used in conventional automobiles, the constituent amount of carbon in the first component is preferably substantially less than a carbon concentration of a baseline motor gasoline blend, e.g., preferably less than about 40% of the carbon concentration of the baseline gasoline, more preferably less than about 25%, still more preferably less than about 10% by weight, and most preferably a first component containing essentially no carbon.

The range of first component concentrations of the inventive mixture will vary based on factors that include the specific composition of the first two or three components of an inventive mixture, other components present in the inventive mixture, combustion controls & performance requirements, separated mixture properties and other related apparatus/fuel variables. However, mixture concentrations of some other first components are generally expected to have similar concentrations as the ranges of ammonia concentrations previously described. Ammonia-like compounds consist essentially of ammonia, amides, amines, amino acids, and/or other chemical compounds containing at least one functional NH, NH2, or NH3 group.

Another possible first component of the inventive mixture is hydrazine. Similar to ammonia, pure hydrazine has no carbon content and is flammable in air. More specifically, hydrazine and related forms of hydrazine have a long history of use as a rocket fuel with the proven technology for safely storing and handling the fuel. Also similar to ammonia, hydrazine can be mixed/dissolved with water and many organic solvents. Liquid hydrazine also has an energy density similar to liquid (pressurized) anhydrous ammonia.

Still other compounds having hydrogen as a significant element in the absence of substantial amounts of carbon may be used as the first component of the inventive mixture, e.g., a primary amine or other ammonia-like compounds. Although many preferred first components consist essentially of compounds having nitrogen-hydrogen bonds that exclude substantial amounts of carbon by weight and/or limit other elements to a minor wt. portion of the first component in order to reduce $CO_2$ emissions, first components having some carbon content, especially those with larger fractions of hydrogen content, may be preferable in some applications, e.g., for cost or efficiency considerations.

Other examples of a first or ammonia-like component with limited carbon as a constituent include monomethyl hydrazine or unsymmetric dimethyl hydrazine. More specifically, when carbon is also a significant constituent of the first component, preferably at least about 50 percent by weight of the component consists of hydrogen and nitrogen, preferably at least about 60 percent by weight of hydrogen and nitrogen. The limited carbon content reduces the formation of $CO_2$ and CO combustion exhaust emissions or other oxidized emissions when compared to the use of other mixtures having a higher weight percentage of carbon.

The second component of the inventive mixture is a carrier fluid of the first component, e.g., if ammonia is the first component, the second component can be an ammonia solvent such as water and/or some alcohols. A preferred second component is a fluid that is generally a liquid under standard conditions of temperature and pressure (e.g., 68° F. and one atmosphere) that can dissolve significant amounts of the first component and/or other solutes as well as act as a co-solvent for an optional hydrocarbon component, e.g., dissolve at least about 0.01% ammonia by weight, more preferably dissolve at least about 1.0% ammonia by weight, and still more preferably dissolve at least about 5% ammonia by weight in a three component mixture. The function of the second component is not limited to being a solvent, co-solvent, or otherwise as a carrier component, e.g., an alcohol can also function as another NOx reducing agent and a combustible fuel. However, the carrier or co-solvent function of the second component is necessary for some embodiments of the inventive mixture and processes. Although a preferred carrier fluid component would also function as a co-solvent for an optional third HC component, other solvents and/or emulsifiers may also be used (e.g., as a fourth component) to create a mixture having the first, second, and optional third components even if the second component is not a co-solvent for the first and optional third components.

Mixtures of ammonia dissolved in water (i.e., ammonium hydroxide) are widely used commercially. For example, up to about five percent or more of ammonia hydroxide may be present in household products such as window cleaners. Dissolving or mixing increasing amounts of ammonia with a carrier fluid such as water typically tends to increase accidental spill and other risks compared to lower concentrations of ammonia, but the risks are still generally less than comparable risks storing and handling anhydrous ammonia.

Ammonium hydroxide may be stored and transported with ammonia concentrations typically up to about 40 percent by weight or more. At very low concentrations, little ammonia odor is generated from the mixture at typical room temperature & ambient pressure conditions. At somewhat higher concentrations, more of an ammonia odor can be detected, but the mixture is relatively safe to handle by consumers and others at typical room temperature conditions. However, when ammonium hydroxide is heated, it can release ammonia gas. Upon further heating, the ammonia gas can begin to decompose into hydrogen and nitrogen at about 450-500° C. Thus, various concentrations of ammonium hydroxide may be safely stored and transported, then heated to generate vapors with enriched ammonia content and/or a hydrogen-containing gas.

If significant amounts of water (e.g., as a carrier component of an inventive mixture) are present in a fuel for an internal combustion engine, the process design for some applications can also be compared to an external combustion, steam engine process. In one embodiment, a water-containing inventive mixture stream is pressurized as a liquid (e.g., by a pump) and heated to generate an ammonia-enriched vapor stream, e.g., the liquid mixture is heated in a tubular heat exchanger by shell-side combustion exhaust gases. After an ammonia-enriched vapor stream portion is removed, the remaining (generally liquid) stream portion may be further heated until it vaporizes into a steam-containing gas stream. Assuming sufficient combustible materials are present in the remaining portion of the inventive mixture, the remaining mixture can be injected into an internal combustion engine with air, the remaining mixture combusted with air, and the hot (steam plus exhaust) gas expanded against a turbine blade or piston, e.g., in an internal combustion chamber. The steam portion of the mixture can supply significant work during expansion in an IC engine process, somewhat similar to the expansion step in a reciprocating steam engine process. Steam engine technology to pressurize a water-containing stream, heat and vaporize the stream, and expand vapors in a reciprocating engine (or a turbine) is available and known to those skilled in the art.

Diesel-water emulsions have also been considered for reducing NOx, e.g., see executive summary, pages 1-6, Emission Reduction Technology for Diesel Backup Generators in California, California Energy Commission, report no. 500-01-028, December 2001. Thus, the use of water as a carrier component may also decrease NOx independent of its use as a carrier of a NOx reductant. In addition, alcohol has been considered as a NOx reducing agent, e.g., see abstract of "Aftertreatment of a Lean-Burn Natural Gas Engine," Engine Technology Progress in Japan," SKU 11998046. However, as used herein, one of the functions of a carrier component is to dissolve or otherwise carry the first component, e.g., to act as a co-solvent for ammonia and HC fluid components. Although the great majority of the second component is expected to remain in the separated liquid and combusted in preferred embodiments, some of the second component may be included in the separated vapor stream and assist in reducing NOx and/or other exhaust emissions.

If hydrazine and water are the 1st and 2nd components of a mixture, hydrazine-water mixtures can be safer to handle than hydrazine by itself. Storage and handling equipment for hydrazine and/or related water mixtures are also commercially available.

If water is primarily used as a carrier fluid, only small amounts of water can be typically dissolved in some optional HC fluids. However, some HC fluids, e.g., aromatics typically found in some gasoline mixtures, may be able to dissolve increased amounts of water when compared to the other gasoline components, thus hydrocarbon mixtures other than typical gasoline or diesel blends may be able to dissolve increased amounts of ammonia and/or water. If the amount of water exceeds the solubility in a HC component, an additive (e.g., as a fourth component) may be mixed to emulsify the mixture. If a generally liquid inventive mixture is layered, e.g., a first layer with a high concentration of the first two components and a second layer with a high concentration of the optional third component, this type of inventive mixture may require mixing in a fuel handling system of a vehicle. Other additives and/or component(s) may also act as a co-solvent or as an aid to keep more of first and second components dissolved in a third component. Potential co-solvents or additives include some surfactants, emulsifiers, isopropanol (previously used to dissolve separated water in gasoline fuel tanks), 2-propanol (previously shown effective in mobilizing BTEX from soil samples), tertiary butanol (TBA), and mixtures of more than one surfactant and/or alcohols. It should be noted that it might be desirable to also include a corrosion inhibitor in the inventive mixture, especially if the fuel handling system is susceptible to corrosion and water is present in significant amounts.

Ammonia as the first component can be mixed with and carried by many second component fluids that may include a carbon element. Examples include methanol (which may be co-produced with ammonia), ethyl tertiary butyl ether (ETBE), ethanol, other alcohols, other polar solvents, molasses, hydrazine, and various oils. Although some of these carrier fluids are flammable and may contribute to engine performance, water or other non-flammable carrier fluids may be mixed with ammonia and the mixture may have desirable properties when it is used in the fuel for an IC engine and/or separated with a vapor portion, e.g., acting as an exhaust emission reductant. These other desirable properties may include co-solubilities (e.g., with ammonia and/or gasoline or diesel) and distinctive vaporization temperatures, e.g., a vaporization temperature that allows separation/distillation of relatively pure ammonia from the mixture and/or scrubbing out of non-ammonia constituents of an ammonia-enriched gaseous stream.

The composition of the carrier or second fluid component for some applications may also be a mixture of constituents such as a plurality of alcohols as previously discussed. For example, mixtures of isopropanol and n-pentanol (with or without ethanol) may be used as a carrier or co-solvent component for some applications. Mixtures of constituents that make up the second fluid component may also be especially useful for co-solvent applications where the third component is diesel or other hydrocarbon mixtures, e.g., where various alcohols can be used as a second component to dissolve various hydrocarbons contained within a diesel/biodiesel fuel mixture.

Although a non-combustible carrier or second component of an inventive mixture may be the major component in some applications, smaller concentrations are expected for many initial applications that include a third or HC component. For example, for a non-combustible carrier component such as water, a concentration of less than about 10% non-combustible carrier by weight of the inventive mixture is initially preferred, more preferably less than about 5%, still more preferably less than about 2%, e.g., in applications where only small reductions in energy density of the mixture is acceptable compared to fuel mixtures without a non-combustible component. However, small amounts of a non-combustible fluid as a second component may lower the combustion temperature and/or may minimize the formation of some unwanted exhaust emissions.

Combustible carrier fluids typically have a wide potential range of concentrations in an inventive mixture. Specific concentrations are typically dependant upon many factors, e.g., the composition, boiling points, and solubilities of the specific components of an inventive mixture. For example, methanol has a boiling point of about 149° F., ETBE has a boiling point of about 160° F., and ethanol has a boiling point of about 173° F. The different boiling points of these and other second components may require different first component separation methods and/or produce vapor streams having different enhanced concentrations of the first component. In addition, each also has different gasoline/diesel solubility characteristics, different combustion characteristics, and different ammonia co-solubility/separation characteristics if ammonia is the first component and gasoline or diesel is the third component. Varying applications, emission objectives, costs, handling equipment, safety concerns, and supply availabilities may also influence carrier fluid selection and/or concentrations.

If ammonia is the first component and an alcohol (e.g., ethanol) is the carrier fluid component, an inventive mixture containing no more than about 10-20 percent alcohol by weight is preferred for some initial applications, e.g., where only small amounts of ammonia are desired for limited reduction of NOx. With increasing amounts of NOx reductions and $CO_2$ reductions desired, at least about 25% by weight of alcohol may be preferred, more preferably at least about 35%, and still more preferably at least about 40% concentration by weight of an inventive mixture. Some other alcohols are expected to have somewhat similar concentrations in alternative inventive mixtures.

Other potential carrier fluids include esters such as ETBE. ETBE can tolerate water in mixtures with gasoline, and a portion of the feedstock typically needed to make ETBE can be derived from biomass-based ethanol. Esters may also be a good co-solvent with some first and third components. In addition, some esters are similar to alcohols in that they are combustible; possibly improving performance compared the other inventive mixtures using different carrier fluids.

In another embodiment of the inventive mixture, ammonia-water mixtures (as the first and second components) are mixed with another second component, specifically an alcohol or alcohol mixture. The solubilities of ammonia, water, and some alcohols allow a range of compositions of this type of inventive mixture with and without an optional third HC component.

Some two-component-only embodiments (e.g., where ammonia is the first component and an alcohol is the second component in the absence of a significant concentration of a HC third component such as gasoline or diesel) can have advantages in some applications. For example, ammonia-alcohol mixtures have little variability in some properties (e.g., when compared to the variability of typical HC fuel mixtures) so that combustion chamber design and combustion processes can be better optimized. It may also be easier to separate an ammonia-enriched vapor stream from a two-component inventive mixture, e.g., obtaining a vapor stream that is closer to pure ammonia than if a third HC component (with a range of boiling points) is present. Since alcohol as the second component can be considered as being used as an ammonia carrier (where ammonia is dissolved in the alcohol) and as a combustible fuel (after at least some of the ammonia is stripped off), this configuration can be considers similar to an alcohol-fueled vehicle with NOx emission controls. A two-component mixture may also allow increased amounts of ammonia to be dissolved. Moreover, future vehicles designed to use a two component inventive mixture may be rapidly commercialized since alcohol-fueled/alcohol mixture fueled automobiles are currently available. Moreover, alcohol-based fuels and the related technology to safely handle and transport the fuel are also commercially available, e.g., in Brazil.

A two-component mixture with substantial amounts of a first component such as ammonia may also be considered as a means for storing hydrogen. By thermal or other means, the ammonia component can be disassociated into hydrogen and nitrogen. This means for storing hydrogen allows the use of fuel cells or other hydrogen-consuming uses on-board a vehicle without the need for high pressure gaseous hydrogen storage or cryogenic liquid hydrogen storage or other more costly means for on-board hydrogen storage.

In substantially two and three component inventive mixtures, saturation of ammonia in the mixtures is not necessarily desired. Larger amounts of the second or carrier component may be desirable for various reasons that are not directly determined by the amount of saturated ammonia that can be carried, e.g., use of the carrier component as an oxygenate to control combustion emissions (beyond its use to carry ammonia as a NOx reductant), use of the carrier component to replace petroleum-based fuels, use of the carrier component to scavenge water, and as the primary fuel, especially where only two components are essentially present in the inventive mixture. For example, since several alcohols, alcohol mixtures, and alcohol-surfactant mixtures can be used as the second or carrier component offering a very wide range of ammonia (and other first component) solubilities and ammonia/HC (or other first and third component) co-solubilities, there is little or no need to use saturated amounts of ammonia or other first components in substantially two or three component mixtures. In addition, there may be safety and other reasons to limit ammonia and other first component concentrations in inventive mixtures to something less than saturated, e.g., for initially preferred mixtures for use in conventional vehicles with little or no modifications.

An optional third component of the inventive mixture is a HC component, typically an unleaded fluid having a mixture of hydrocarbon (HC) compounds. Hydrocarbons are molecules that contain hydrogen and carbon with various molecular lengths and structures, e.g., straight chains, branching chains, or ring structures. Although a HC or HC fuel component is defined herein as a fluid-like material (e.g., a generally liquid phase or a slurry) mostly composed of hydrogen and carbon elements, a third or HC component may also include minor amounts of other constituents. An unleaded fluid will be defined herein as a fluid consisting of elements essentially in the absence of metal-containing (e.g., octane-enhancing) additives such as those having a substantial lead or molybdenum content. Many embodiments use HC fluids similar to currently commercially available diesel or unleaded gasoline blends substantially produced from crude oils in refineries. These refinery products are typically mixtures of hundreds of hydrocarbon compounds, e.g., unleaded motor gasolines. In the specific embodiments and examples that follow, the HC materials in these embodiments will be understood as typically mixtures of compounds, composed mostly of hydrogen and carbon elements.

In one embodiment of the inventive mixture, an ammonia-alcohol mixture (as the first and second components) is combined with a gasoline-type (e.g., a modified motor gasoline) mixture as the optional third component. The solvent and co-solvent properties of some alcohols allow a range of inventive mixture compositions.

Unleaded motor gasoline is typically a mixture of hundreds of hydrocarbon compounds having a range of properties within limits that allow for reliable automotive performance with reasonable cost. This includes low carbon number molecules or "light" hydrocarbon compounds, e.g., to reliably vaporize and combust the fuel in an IC engine, especially in cold starting conditions. However, excessive amounts of light hydrocarbons (e.g., methane and butane) may cause unacceptable evaporative emissions and/or other problems. Specific amounts of the lighter components in these gasoline mixtures may vary depending upon the season, application, and other component concentrations.

Another way of viewing some inventive mixtures is that combining a low boiling point (i.e., light) first component such as ammonia and/or a second carrier component such as several alcohols having boiling points under 200° F. allows combining these first two components with a heavier third HC component having a higher boiling point range when compared to conventional gasoline mixtures, i.e., the third component is heavier than many unleaded motor gasoline mixtures. This creates an inventive mixture that has a boiling point range that can be more comparable to typical unleaded motor gasolines than any one or several of the components and more suitable for combustion in an IC powered vehicle than the third HC component by itself. Because the ammonia & alcohol may replace a range of light hydrocarbons, any one distillation temperature may not be comparable to a motor gasoline, but the inventive mixture blend may have at least a portion of an overall range of distillation temperature points comparable to current motor gasoline blends as defined by current ASTM motor gasoline specifications such as ASTM D86, e.g., inventive mixtures having somewhat similar T10s (the temperatures where 10% of each mixture has vaporized), T50s, T90s, and final boiling points. In other words, the lower boiling point ammonia and/or alcohols can replace some of the lower boiling point hydrocarbons in current motor gasolines blends and/or a baseline gasoline blend. Moreover, some of the functions of the lighter HC constituents may also be performed by the alcohol and ammonia components making the mixture more suitable as a fuel than just the third component of the inventive mixture.

In some inventive mixtures, the heavier HC components are preferably produced in a refinery and the third component of the inventive mixture may be considered a modified gasoline or modified diesel mixture. In one embodiment, a modified gasoline mixture contains reduced amounts of butane when compared to some motor gasolines and/or a baseline gasoline. If ammonia is the first component, a slightly heavier HC blend component can be one factor in allowing initially small concentrations of ammonia (in the inventive mixture) to be used in existing vehicles with little or no modifications and with few adverse impacts. In other embodiments with higher concentrations of ammonia, additional modifications to the distillation temperatures of the third component mixture may be required.

The IBP differences using a modified (heavier) gasoline/alcohol/ammonia mixture may make the separation of an ammonia-enriched stream from an on-board storage vessel easier to accomplish when compared to mixtures consisting of conventional motor gasoline, ammonia, and some alcohols. The preferred IBP of a modified gasoline component for some applications is no more than about 135° F., no more than about 125° F. is more preferred, no more than about 115° F. still more preferred, and no more than about 110° F. most preferred for some embodiments such as winter grade mixtures. For some applications, a T10 of the modified gasoline component of at least about 135° F. is preferred, at least about 150° F. is more preferred, at least about 158° F. still more preferred, and at least about 165° F. most preferred for some embodiments.

Preferably, an unleaded modified gasoline component (to which the ethanol and ammonia components are added) has a distillation temperature at which 50% is distilled (T50) that is sufficiently high such that the ethanol and ammonia addition does not cause T50 values of an inventive mixture to drop below 215° F. Similarly, a preferred modified gasoline distillation temperature at which 10% is distilled (T10) is sufficiently high such that the ethanol and ammonia addition does not cause the T10 value of the inventive mixture to drop below 120° F.

Reid Vapor Pressure (RVP, as defined by ASTM specifications, e.g., ASTM D323) is another modified gasoline property for a third component of the inventive mixture that may be reduced in some embodiments when compared to typical motor gasoline RVPs especially when (lower boiling point) ammonia and some alcohols are the first and second components. In addition, a substantially oxygenate-free, unleaded gasoline blend stock that can be used to produce a modified (heavier) gasoline component may have an RVP of no more than 6.5 psi, preferably no more than 6.0, and more preferably no more than 5.5 psi. When this blend stock is mixed with substantial amounts of the first and second components, the unleaded inventive mixture can meet the California Code of Regulations for summer maximum RVP. An RVP of less than about 7.5 psi is preferred for some inventive mixtures, less than about 6.5 psi is more preferred.

Because ammonia, some alcohols, and other 1st and 2nd components act as Otto-cycle octane enhancers, this can also allow a modified, e.g., heavier, gasoline-like third component to have a reduced octane number (R+M/2). As a substitute for regular grade gasoline or gasoline-alcohol mixtures having an octane rating of at least 87, a modified gasoline-like component may have an (R+M)/2 octane rating preferably less than 87, more preferably less than 86.5, still more preferably less than 86, and most preferably less than 85.5, e.g., for some inventive mixtures with larger proportions of alcohol and ammonia. In essence (no pun intended on the French word for gasoline), alcohol and ammonia can be added to a less than 87 octane, unleaded gasoline blend stock in an amount such that the unleaded inventive mixture meets the 87 octane minimum specification. Similarly, as a substitute for a premium grade gasoline or gasoline-alcohol mixtures having an octane rating of at least 91, inventive mixtures may be a modified gasoline component that is preferably less than 91, more preferably less than 90.5, still more preferably less than 90, and most preferably less than 89. Again, the ammonia and/or alcohol are added to the less-than-91 octane modified gasoline component such that the resulting inventive mixture meets the minimum octane rating of 91. As a substitute for a mid-grade gasoline or gasoline-alcohol mixtures having an (R+M)/2 octane rating of at least 89, the modified gasoline component can have an octane rating preferably less than 89, more preferably less than 88.5, still more preferably less than 88, and most preferably less than 87.

In an alternative embodiment, an optional third HC component is a diesel fuel or motor gasoline, e.g., a diesel fuel meeting the current ASTM requirements such as ASTM D 975 and suitable (i.e., capable of fueling reliable long-term operation) for a conventional diesel engine or, e.g., a gasoline having an octane rating as defined by current ASTM specifications such as D4814 and suitable for use in a Otto cycle (i.e., spark-ignition) engine, i.e., suitable for fueling the generally reliable operation of an Otto cycle engine for at least 100,000 miles, preferably in excess of 150,000 miles. The third HC component is not necessarily soluble with the first and second components, especially when large amounts of the first and second components are used, but the third component and $1^{st}$ and $2^{nd}$ component mixtures are generally liquids at room temperature and pressure conditions and can be typically mixed even if the resulting mixture is not homogeneous. Motor gasoline and many alcohols are highly soluble and motor gasoline-alcohol-ammonia mixtures may have performance, safety, and emission benefits over modified gasoline mixtures for some applications especially where the ammonia concentration is low. In current gasoline-oxygenate fuel mixtures where an alcohol is the oxygenate, alcohols are sometimes limited to no more than about 10 or 15 percent of the mixture. The combined alcohol and ammonia concentration in an inventive mixture may have a similar limitation, but other concentrations are also possible, especially for applications with increasing needs to limit $CO_2$ emissions.

For inventive mixtures that include a middle distillate (or heavier HC component), such as a diesel fuel or a modified diesel fuel mixture, another co-solvent or other additive may be desired in order to supplement one carrier component. For example, only limited amounts of methanol can typically be dissolved in a middle distillate such as diesel fuel. However, as disclosed in U.S. Pat. No. 4,395,467, limited amounts of water and/or at least one ketal, acetal, or orthoester may be used so that a middle distillate is more miscible in some alcohols, i.e., a relatively stable liquid phase is formed that contains the components, including a middle distillate or heavy HC component. Preferably, the second component by itself is sufficient to act as a co-solvent of the first and third components, avoiding the need for an additional emulsifier or other additives.

For motor gasoline as the third component of some initial inventive mixtures where limited automotive modifications are desired, the motor gasoline component preferably comprises at least about 60%, more preferably at least about 75 percent, still more preferably comprises at least about 85 percent, and most preferably comprises at least about 90 percent by weight of the inventive mixture. If controlling increasing amounts of $CO_2$ and/or CO emissions is desired, a transition to increased alcohol and/or ammonia-content fuels may reduce the amount of the motor gasoline component in the mixture and also allow other uses of the ammonia component to reduce these emissions, e.g., at least some of the ammonia is separated to be used by fuel cells. For example, during a transition period leading to a period where fuels do not have a substantial concentration of a HC component, the HC concentration in a transition inventive fuel mixture is preferably less than about 40% by weight, more preferably less than about 30%, still more preferably less than about 20% by weight.

In alternative embodiments, other constituents of a third component (or still other components) may include dissolved carbohydrates (e.g., a sugar) or other combustible materials, possibly raising the distillation temperature range of the inventive mixture. Although adding carbohydrates or other combustible materials to the third component mixture can have some advantages, it will be understood in the art that combustible materials potentially producing particulates or deposits in a combustion process may not be preferred, especially in internal combustion engines.

In a preferred apparatus and/or process embodiment of the invention, a separated liquid portion of the inventive mixture is combusted in an internal combustion (IC) engine. Since the separated liquid portion will typically still contain some ammonia or other NOx reductant, the combustion of this portion by itself may reduce one or more unwanted emissions when compared to motor vehicles using conventional motor gasoline, gasoline-oxygenate, or diesel mixtures. This reduction of emissions can occur with or without injection of a vapor portion (of the inventive mixture) into the exhaust gases, e.g., with larger concentrations of ammonia and some alcohols, there is typically less carbon in the inventive mixture used as a fuel when compared to motor gasoline fuels for comparable amounts by weight and/or energy content, thus less carbon dioxide is generally emitted. If the combustion processes are comparable, less carbon monoxide and unburned hydrocarbon emissions from the engine may also result.

In a more specific preferred apparatus, an internal combustion engine is attached to a hybrid vehicle as part of the power train. In a typical power train for a hybrid gas-electric vehicle, an internal combustion engine drives an electric generator. The output of the electric generator may be used directly at electric motors driving one or more wheels of the hybrid vehicle, but may also be used to charge batteries or run accessory electrical equipment. When power demand is low, the internal combustion engine may even be shutdown for a time and the power demand satisfied by charged batteries or other means. At least in part because of the multiple electrical uses, the internal combustion engine in a hybrid vehicle (when running) tends to run at closer to constant power output when compared to internal combustion engines directly driving wheels in a conventional automobile. Because the effectiveness of a reductant such as ammonia when mixed with exhaust gases is somewhat dependent upon the exhaust gases being within a range of elevated temperatures and because exhaust gas temperatures in a hybrid vehicle tend to be less variable, the emission-reducing effectiveness of the NOx reductant mixing with the exhaust gases tends to be increased.

Besides the first, second, and optional third components of the inventive mixture previously discussed, it will also be understood by those skilled in the fuel arts that other components may be present in the inventive mixture, e.g., additives such as injector cleaners, cetane improvers, lubricity improvers, smoke suppressants, antifoamers, de-icers, low temperature additives, drag reducers, antioxidants, stabilizers, metal deactivators, dispersants, biocides, emulsifiers/demulsifiers, and corrosion inhibitors. In addition, one or more pre-combustion reactions may occur among all or some of the components of the inventive mixture forming reaction components. Moreover, some or all of the components may be formed by one or more reactions among still other components or pre-components. These other components, pre-combustion reaction components, and/or pre-components of the mixture may form a significant weight portion of the final inventive mixture. As used herein, an inventive mixture having at least a first and a second component is not limited to those components and the term first and/or second component of an inventive mixture shall be understood to include any relevant additives, pre-components, reaction components, or other related components.

Several processes may be used to prepare/produce inventive mixtures, with preferred processes occurring at least in part within an oil refinery. In one process, ammonia and/or one or more alcohols (e.g., derived from agricultural waste products or other non-oil sources) are transported to a refinery where they is combined with HC blend streams derived from crude oil and/or other sources. Thermal, catalytic, reformer, and other refinery processes (well known in the art) can be used to produce various HC blend streams, mixtures, as well as other products that may be used as a third component (or other components) of an inventive mixture. If the non-oil sources of the 1st and 2nd components are proximate to each other, these two components of the inventive mixture can be premixed together (perhaps with other components) and transported to a refinery to be mixed with the optional 3rd component.

Alternatively, at least portions of the first two components (as well as a third or other components) may be produced and blended at a refinery. Still another alternative process embodiment transports a first component dissolved in a temporary fluid that is removed at least in part prior to mixing the first component with a second and/or third component, e.g., ammonia mixed with water, at least some of which is removed prior to mixing with an alcohol and/or a hydrocarbon fluid. If a three component inventive mixture forms a plurality of liquid layers, a blending process may include adding emulsifiers, added co-solvents, or other additives. Agitating the inventive mixture may also be used to mix liquid layers during a blending process, e.g., using stirrers.

In addition to the mixing/blending processes discussed above, another process embodiment includes the step of supplying one or more inventive mixtures to a significant number of distribution facilities spread out over one or more areas/population centers. For example, supplying at least 5 service stations (that also may dispense other fuel mixtures) in a metropolitan area with at least a total of at least 50,000 gallons per month of at least one type of an inventive mixture or supplying at least 10 service stations in several geographic areas in a single US state with at least a total of 100,000 gallons per week supplied to that state. These quantities are beyond any laboratory or other quantities that may be produced for limited-focus purposes, e.g., research quantities, showing the beneficial properties of the inventive mixture when used as a fuel for commercial vehicles were unexpected.

Another process would distribute at least 10,000 gallons per month of one type of inventive mixture to at least two facilities (e.g., within an agricultural area) that supply the inventive mixture to vehicles and also distribute anhydrous ammonia and/or ammonium hydroxide. Another process would distribute a total of at least 400,000 gallons of several different inventive mixtures per week to several different geographical locations within the US, e.g., locations at different altitudes and/or average ambient temperature patterns requiring somewhat different inventive mixture compositions and/or properties.

Another method embodiment for producing an inventive carrier fuel-NOx reductant mixture comprises: step 1) blending at least one ammonia-containing batch or fluid stream, at least one fluid stream or batch containing an ammonia carrier, and at least one unleaded hydrocarbon-containing stream or batch resulting in at least 50,000 gallons per month or 1,000 gallons per batch of an unleaded fluid-reductant mixture volume suitable for combustion in an automotive, Otto-cycle engine wherein the hydrocarbon-containing stream or batch has the following properties: (a) a Reid Vapor Pressure less than 6.9 psi; (b) a 10% D-86 distillation temperature no less than 140° F.; (c) an aromatics content of no more than about 4.5 volume percent; and (d) an (R+M/2) octane value of no more than 86.9; step 2) commencing delivery of the unleaded fluid mixture to a plurality of vehicle fueling stations; and 3) combusting at least a portion of said blended fluid mixture in vehicle engines to produce exhaust gases having less NOx than if a comparable volume of a baseline motor gasoline were combusted in baseline internal combustion engines.

In order to better understand the inventive apparatus and method for using the inventive composition mixtures, the following discussion will generally compare the inventive apparatus and inventive method of using the inventive mixture to a baseline apparatus and/or a typical gasoline-powered automobile and a typical method of using standard gasoline mixtures in a baseline apparatus or typical automobile. In a baseline vehicle or baseline automobile, herein defined as a model year 2000 Toyota Camry LE sedan with a standard four-cylinder engine using a 87 octane motor gasoline mixture, air is typically aspirated through one or more pre-combustion devices, such as a filter, into one of at least four generally cylindrical chambers each having a reciprocating piston. A mostly enclosed space typically bounded by a piston face, cylindrical walls, and a cylinder head is generally referred to as a combustion chamber within each cylindrical chamber. In other conventional vehicles, intake air (i.e., air to be combusted and/or otherwise used by the vehicle) may also be pressurized prior to entry of at least a portion of the intake air into the combustion chamber. After entry of the intake air into the combustion chamber, the air is typically pressurized or further pressurized by closing an intake valve and the compressing motion of a reciprocating piston in the cylinder decreasing the volume in the essentially sealed combustion chamber as the piston moves towards one end of the cylindrical chamber. Although intake air and fuel have been aspirated and mixed in a carburetor into the combustion chamber in some older automobiles (and the fuel-air mixture then compressed by the reciprocating piston), the baseline vehicle uses a fuel pump to inject pressurized fuel quantities from a fuel injector manifold into combustion chambers generally after some amount of air compression has occurred. A transfer fuel pump is also generally used to transfer fuel from an on-board storage tank.

Typically, the fuel injection pattern within the combustion chamber (with other design factors such as piston shape, valve design, and chamber shapes over time) is currently designed to intimately mix the injected (typically mostly liquid) fuel and (compressed) engine intake air. The mixing conditions within the combustion chamber also tend to at least partially vaporize a portion of the injected liquid fuel in the compressed air prior to spark ignition. Periodically injected fuel quantities into each combustion chamber are controlled to obtain specific air-fuel (A/F) mixture ratios, e.g., ratios to obtain acceptable emissions and performance. Upon ignition (e.g., with a spark plug when the piston is near the end of its travel in one direction), the air-fuel mixture combusts and the resulting combustion gases expand as the piston is forced down the cylinder followed by an exhaust valve opening to discharge the combustion gases to an exhaust system. This fundamental or simplified combustion process with a baseline gasoline or gasoline/alcohol fuel mixture in a baseline Otto cycle engine within a baseline vehicle is generally similar to the process of combusting at least a major portion of the inventive mixture in an Otto cycle internal combustion (IC) engine, sometimes with modifications to the baseline vehicle as hereinafter described, e.g., modifications to the A/F ratio controls.

Although an onboard (the vehicle) means for separating an inventive mixture stream into at least two streams and injecting at least a portion of one stream into the exhaust gases will typically require modifications to a baseline vehicle (as later described), little or no differences may exist between an automotive engine using an inventive mixture and the baseline automotive engine using a conventional or baseline gasoline mixture (such as the baseline values for fuel parameters of a baseline gasoline, hereinafter Baseline Gasoline, listed in Table 5.6, Ozone-Forming Potential of Reformulated Gasoline (1999), the National Academies Press, Commission on Geosciences, Environment and Resources. The preferred little or no engine differences between conventional and inventively modified engines are especially applicable for inventive engines designed to use initially preferred small concentrations (i.e., no more than about 0.2% of the inventive mixture) of ammonia or other first component in the inventive mixture. The addition of slightly larger amounts of ammonia to an existing gasohol mixture may require some related equipment changes, e.g., possible changes include the fuel nozzle dimensions and fuel-air mixture controls. Preferably, an initial inventive mixture stream (e.g., without separation into liquid and vapor streams) can also be combusted in a baseline vehicle (as hereinbefore defined) without any apparatus modifications.

Other vehicle and/or engine modifications may be needed in order to make the engine more suitable for the combustion of at least a portion of the inventive mixture, especially if ammonia concentrations of the inventive mixture are significantly more than the initially preferred small amounts, e.g., additional storage vessel insulation and/or pressure containment capability may be required. Still other modifications may also be needed, e.g., providing an ammonia-enriched stream aspirator in the intake air stream such as item 10 shown in FIG. 2

Although ammonia is typically not a significant component of current motor gasolines, ammonia may be emitted from automobile exhaust systems in typical conventional automobiles. These ammonia emissions occur on vehicles with catalytic converters using conventional motor gasolines, e.g., see "Catalytic Converters Fix One Pollution Problem, Cause Another," Environmental News Network, CNN, Nov. 27, 2000, at CNN.COM Nature, pages 1-2. Under some applications, especially if an inventive process uses an ammonia slip catalyst, a reduction in ammonia emissions may result when compared to current ammonia exhaust emissions from conventional gasoline-powered vehicles.

In addition to the reduction of NOx emissions resulting from injecting an ammonia-enhanced portion of the separated inventive mixture in the exhaust system, NOx emissions from vehicles powered by the inventive mixture and process may also be decreased by the lower amount of NOx initially exhausted into the exhaust system as a constituent of the combustion exhaust gases produced by the combustion of primarily the separated liquid stream. For example, see U.S. Pat. No. 4,166,724. The lower NOx emissions from the combustion of some of the first and/or second components of the inventive mixture, e.g., alcohols and/or ethers such as ETBE, that have been recognized to act as oxygenates that can reduce NOx emissions when mixed with gasoline and/or diesel fuels. Some carrier components, e.g., ETBE, may also help to reduce the RVP in some inventive mixtures and the reduced RVP may also reduce NOx and/or other emissions. Emission reductions may also result from a reduced combustion temperature and more specific advantages related to the components selected, e.g., see "Ethyl Tertiary Butyl Ether," Governors Ethanol Coalition, last page.

One method embodiment for a vehicle with an internal combustion engine uses an inventive mixture having a reductant component, a reductant carrier component, and a hydrocarbon component, the method comprising: separating the inventive mixture into at least a first major portion and a second minor portion; combusting at least some of the first major portion in the internal combustion engine; and injecting at least some of the second minor portion into combustion exhaust gases at a first location, wherein the amount of NOx in the exhaust gases downstream of the first location is reduced as compared to NOx in the exhaust gases upstream of the first location. More specifically for using an inventive mixture having ammonia as a reductant component, ethanol as a reductant-carrier component, and a motor gasoline component, the method comprising: step 1) separating an inventive mixture into at least a first major, generally liquid portion and a second minor, generally vapor portion having an ammonia component concentration greater than the ammonia concentration in the inventive mixture; 2) combusting at least some of the first major portion into the internal combustion engine; and 3) injecting at least some of the second minor portion into an engine exhaust gas stream creating a reduced exhaust gas stream wherein the concentration of NOx in the exhaust gas stream is reduced downstream of the injection as compared to the concentration of NOx in the engine exhaust gas stream upstream of the injection.

Still more specifically, the method of using an inventive mixture in an automotive vehicle having an internal combustion engine, the method comprising: step 1) introducing into the internal combustion engine a first ammonia-containing inventive mixture portion suitable for combustion in an automotive engine, said mixture having a Reid Vapor Pressure less than 7.5 psi, an octane value of at least 87, a 10% D-86 distillation point no more than about 165° F., and an olefin content of less than about 10 volume percent, wherein combustion exhaust gases are emitted from said internal combustion engine; step 2) mixing a second ammonia-containing mixture portion into at least some of the combustion exhaust gases to form a mixed gas exhaust stream; 3) introducing at least some of the mixed gas exhaust stream into a catalytic converter to form a catalyst-reduced exhaust stream; and 4) discharging the catalyst-reduced exhaust stream from the catalytic converter.

In addition to the inventive compositions and the processes described above, FIG. 1 shows a simplified schematic of an inventive apparatus and process embodiment that uses an inventive mixture IM stored in a vehicle storage vessel or fuel tank 1 within a vehicle (not shown for clarity). The numbering and lettering is generally consistent with the numbering and lettering used in the process shown in FIG. 2. In FIG. 1, an inventive mixture IM is transferred from a fueling facility FF into a vehicle storage vessel 1 through a fill port FP that may also allow a return flow of vapors during (mostly liquid) filling of the storage vessel. However, two portions of the inventive mixture are withdrawn from the fuel tank 1 through a first fluid outlet port P and a second fluid outlet port P1, a first stream or fluid portion through first outlet port P as a generally gaseous or vapor stream VS (in a vapor stream line) and a second portion as a generally liquid stream PFM in the generally liquid line.

For initial embodiments, the fill port FP is preferably similar to conventional automotive gasoline or diesel fuel ports, e.g., including having a twist off filler cap (with an option to lock the cap in place) and provisions to accept a fill nozzle and returning vapor flows during filling operations from a gasoline or diesel fueling/dispensing facility FF such as found is in conventional gasoline/diesel service stations. However, the fill port FP may also be valved (e.g., with a quick disconnect fitting or an openable ball or a check valve), incorporate flow meters or other instrumentation, include separate flow paths for generally liquid inflows and generally vapor return flows, include locked/sealed and unlocked/unsealed indicators, and/or have a liquid overfill preventer. Acceptable materials of construction will somewhat depend upon the components and concentrations of the inventive mixture IM, but various steels and many plastic materials can generally be used.

Two fluid-mixture discharge ports P & P1 are incorporated into this embodiment of an automotive or other vehicle storage vessel 1. At least a portion of the discharged vapor stream VS is directed through an optional compressor or other pre-treatment device 5 as a purified vapor stream VSP flows to a vapor injection port VIP and enters an exhaust-emission treatment device 11 placed in an engine exhaust stream EE coming from an IC engine 9. A stream return portion R (derived from the vapor stream VS) may be returned from the optional compression/pre-treatment device 5. After a portion of the vapor stream VS is mixed with engine exhaust gas stream EE, the reduced exhaust stream EER is discharged to the ambient environment through discharge port D.

The schematic shown in FIG. 1 represents an application where the vapor stream VS comprises an enriched concentration of a first component (e.g., ammonia, when compared to the concentration in the inventive mixture IM) used to reduce NOx in conjunction with the exhaust-emission treatment device 11. For example, the optional fluid compression/pre-treatment device 5 may only consist of a particulate filter, but may also include a means for compressing the vapor stream VS and/or other vapor treatment devices.

In one apparatus embodiment of the invention, the apparatus comprises: 1) a fueling facility FF or other means for transferring an ammonia-containing fluid mixture to a vehicle; 2) a storage vessel 1 having a fill port FP, a generally vapor outlet P, a generally liquid outlet P1 or other means for separating at least two fluid streams from said fluid mixture, wherein a first fluid stream from said generally vapor outlet having an increased ammonia concentration when compared to said ammonia-containing fluid mixture and a second fluid stream from said generally liquid outlet having a decreased ammonia concentration when compared to said ammonia-containing fluid mixture; 3) an internal combustion engine 9 or other means for combusting at least a portion of said second fluid stream, said means for combusting producing an exhaust gas stream; 4) a vapor injector VIP or other means for mixing at least a portion of the first fluid stream with the exhaust gas stream EE wherein a mixed gas stream is produced; and 5) a catalytic converter/exhaust emission treatment device 11 or other means for contacting the mixed gas stream with a catalyst.

In an alternative embodiment, e.g., for applications where further separation and ammonia purification of the vapor stream VS is needed prior to being mixed with exhaust gases EE, the compression/pre-treatment device 5 includes a packed distillation column or other purification devices that concentrate the desired NOx reductant component, e.g., ammonia. Piping, ducting, tubing, or other fluid conduit means for transmitting the ammonia-concentrated vapor stream VS and purified vapor stream VSP are used to conduct these generally vapor streams from the storage vessel 1 to the pre-treatment device 5 and from there to the exhaust-emission device 11. In this embodiment, the pre-treatment device 5 may generate a fluid return stream R (e.g., comprised of separated components from the ammonia-concentrated vapor stream VS that are not transmitted via the purified vapor stream VSP to the exhaust emission device 11) directed back to the storage vessel 1 where it can mixed with the inventive mixture IM. As an option, cooling, heating, or other means for limiting the extreme temperatures of the stored inventive mixture may be included with a compressor, filter, or other pre-treatment device 5, e.g. using an electric resistance heater, a thermoelectric cooler, a heat exchanger using engine coolant and/or ambient air, and mixing with returned fluids. The means for limiting the temperature range of the inventive mixture stored in vessel 1 may also include insulation, heat pipes, radiator surfaces, and evaporative cooling. For example, the vessel 1 may include an exterior evaporator surface of the lower portion of a heat pipe that is immersed in the stored inventive mixture IM while the upper condensing surface of the heat pipe is exposed to the ambient air. In an alternative embodiment, the return stream R is directed to a fuel injection device attached to engine 9 instead of being directed to the storage vessel 1.

Figure 2:
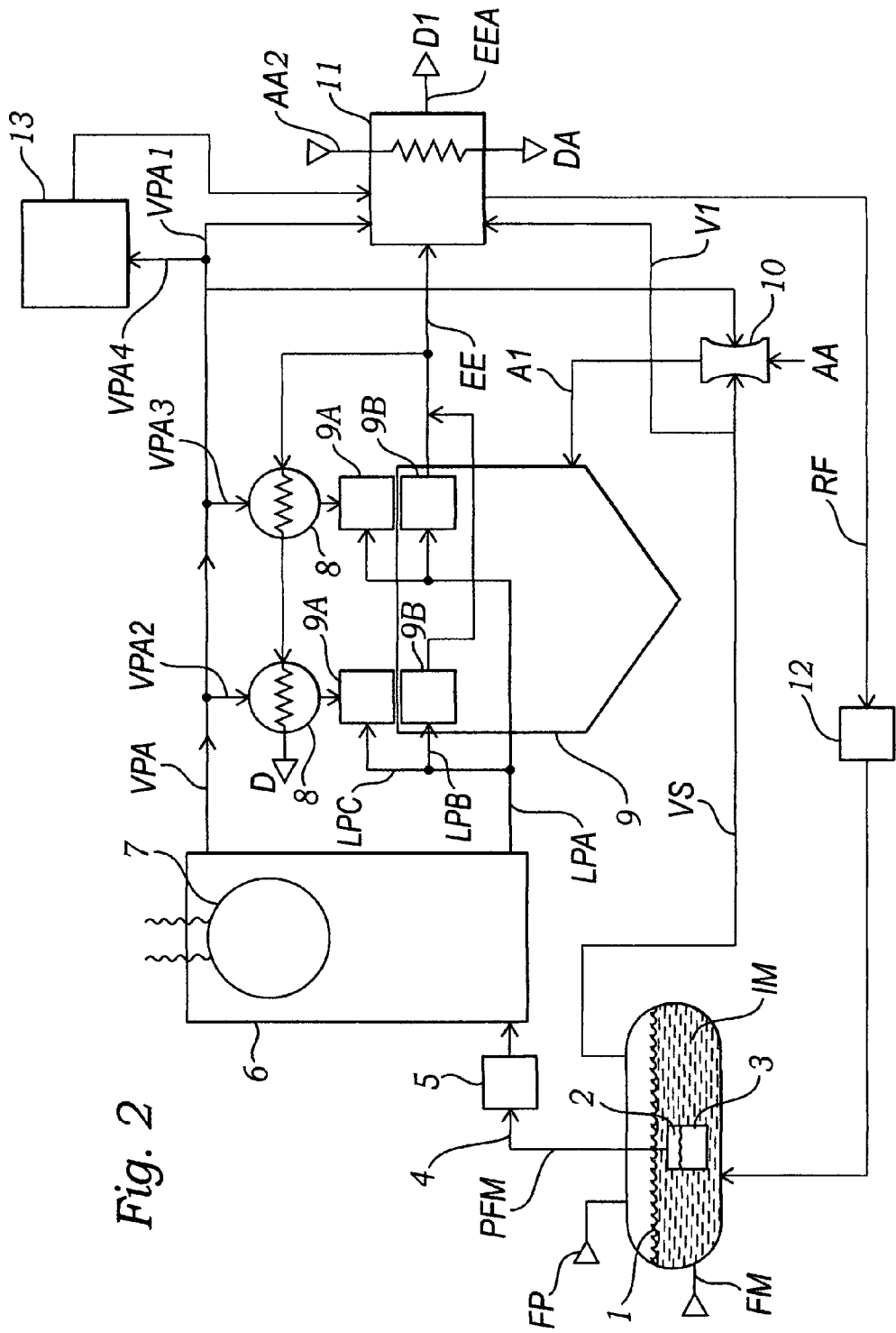
FIG. 2 shows a schematic representation of a more complex embodiment of an inventive apparatus.

As shown in FIGS. 1 & 2, the generally liquid stream PFM is transferred (e.g., by means of a pump 3 shown in FIG. 2) from the vehicle storage tank 1 to an IC engine 9 where the generally liquid stream is combusted. The combustion generates an engine exhaust stream EE that is directed through the emission treatment device 11 (such as a means for mixing with a reductant and catalyst) to form a reduced exhaust stream EER prior to being discharged through discharge port D, e.g., an exhaust pipe discharging the exhaust stream to the ambient atmosphere. Means for mixing fluid streams may include baffles or other stream turbulence-inducing devices, nozzles or other stream velocity changing devices, multiple or other dispersed mixed stream entry locations, and mechanical mixing or stirring devices. For example, for an inventive mixture IM comprising ammonia as the first component (with other components of the inventive mixture having significantly higher boiling points), the vapor stream VS withdrawn from the storage vessel 1 is typically ammonia-enriched when compared to the concentration of ammonia in the inventive mixture. The treated and ammonia-enriched vapor stream VSP may also be further ammonia-enriched using re-boiling or other purification means, e.g., within the pretreatment device 5. The ammonia-enriched stream VSP is used as a NOx reducing agent in the exhaust stream EE and/or in the emission treatment device 11, preferably decreasing NOx exhaust emissions when compared to a conventional gasoline-fueled vehicle exhaust emissions equipped with catalytic converters.

In the schematic shown in FIG. 1, a simple means for supplying a NOx reductant to the exhaust stream EE comprises a means for separating an ammonia-enriched stream from an inventive mixture, e.g., using a separate vapor port P for discharging the vapor stream VS from a storage vessel 1 having sufficient volume so that a gas ullage space is formed above a liquid level and below the vapor port, i.e., the storage vessel serves not only to store a fluid mixture but as a means for separating liquid and vapor portions. Other means for separating and supplying a reductant-enhanced stream VS to the exhaust stream EE may be combined with or used in place of the vapor port P and include: NOx reductant supplied to the engine 9, but discharged as unburned in the exhaust gases, liquid/vapor separators, e.g., swirl-inducing devices at an outlet port, demister devices, enlarged separation or settling cavities, liquid/vapor sensors controlling/diverting flows, and/or float valves.

In the simple embodiment shown in FIG. 1, the vapor pressure of the inventive mixture IM stored in the storage vessel 1 is sufficient to drive the vapor stream VS to the pre-treatment device 5. In other embodiments, the vapor pressure of the inventive mixture IM can be increased or supplemented by other means for removing a vapor stream VS, e.g., a compressor, blower, liquid heater (to increase vapor pressure), vacuum or suction reciprocating pump, and/or an aspirating jet pump.

The fluid pressure difference needed to transfer the generally liquid stream PFM from the storage vessel 1 to the engine 9 can at least be in part derived from the vapor pressure of the mixture IM within the storage vessel, but may also be obtained or supplemented by a fuel pump 3 or other means for pressurizing as shown in FIG. 2. In an initial preferred embodiment, a fuel pump 3 is similar to fuel pumps in conventional vehicles. Other means for pressurizing (or supplementing the pressure of) the generally liquid stream PFM shown in FIG. 1 include a liquid heater (to increase vapor pressure), a positive displacement pump, and locating the fuel tank at a higher level within the vehicle. Other means for transferring the generally liquid stream PFM from the storage vessel 1 to the engine 9 may include additional mechanical or jet pumps and/or reducing the injection pressure within the engine 9.

The engine 9 is preferably an internal combustion engine generally comparable in size and power to the engine in the baseline vehicle and/or other conventional gasoline or diesel engines in conventional automotive vehicles. Combustion fuel is at least in part the generally liquid stream portion PFM. Combustion oxygen is mostly supplied by intake air stream A. It will be understood by those skilled in the art that many other power-train related subsystems, devices, and apparatus typical of a baseline or current engines, subsystems, and related processes have not been shown for clarity in the schematic shown in FIG. 1, e.g., a plurality of individual cylinders, crankcase PCVs, fuel injection systems, intake air filtration systems, and transmission or other power output devices. In will also be understood by those skilled in the art that although the inventive mixture/fuel composition, fuel handling system, and exhaust systems may not be the same as in typical and/or conventional automotive vehicles, the design of the engine 9 (and related subsystems) may be the same as or generally very similar, especially when low-ammonia concentration inventive mixtures are used. In some initial applications, it may be desirable to use an unmodified (or only slightly modified) baseline automobile or other vehicle with an inventive mixture, e.g., the vehicle having no means for separating, no means for exhaust gas/reductant vapor mixing, no ammonia-enhanced vapor pretreatment device, etc. For example, some reduction in undesirable emissions is expected even for use of the inventive mixture in unmodified conventional vehicles because of the combustion of the first or reductant and/or second or carrier components.

FIG. 2 is a schematic representation of a more complex embodiment of an inventive apparatus for reducing one or more unwanted IC (nominally gasoline or diesel) engine emissions. One specific embodiment of this apparatus embodiment uses an inventive mixture IM comprising ammonia as the first component, ethanol as the second or carrier fluid component, and unleaded motor gasoline as the third component forming substantially all of the inventive mixture except for additives and/or unwanted impurities. The term, "substantially all" as applied to this composition is defined as having no other components (other than 3 components, detergents, cetane/octane boosters, and/or other desired additives or unwanted impurities such as sulfur) any one of which exceeds about 0.2 percent by weight of the inventive mixture IM.

The inventive mixture IM is stored primarily as a liquid onboard a vehicle fuel tank or other storage vessel 1. Because of various factors such as the range of solubilities of the specific first, second, and third components of this embodiment of an inventive mixture, (e.g., ammonia, ethanol, and a gasoline-type mixture), a range of component mixture ratios is possible. For example, a 90% gasoline and 10% ethanol mixture can dissolve up to about 0.5% or more of ammonia by weight. Or a 50/50 mixture of gasoline and ethanol can dissolve up to about 3% or more of ammonia. The storage vessel 1 can be designed to contain the inventive mixture IM over an expected range of component concentrations and expected conditions, but the vessel design is initially preferred to be very similar to fuel tanks on the baseline and/or other conventional vehicles.

Although conventional metal storage vessels (or vehicle fuel tanks) can generally be safely used for many initial and other applications, for a vehicle storage vessel 1, multiple wall vessels and/or fiberglass-reinforced vessels may be preferred, especially for storing mixtures containing higher concentrations of ammonia. The space between multiple walls of a storage vessel 1 may also be filled with ammonia-absorbing/adsorption material (such as some zeolites) or ammonia-dissolving materials such as water. Some non-metal materials of construction for one or more vessel walls, coatings, or linings (such as a Teflon coating) may also be preferred for some applications to be more resistant to abrasion and/or corrosion. In an alternative embodiment, a liquid fill & drain line and port FM may also be used, e.g., as a safely relief.

The storage vessel 1 is typically designed to be attached to a vehicle at a protected and/or interior location (e.g., within a box frame of an automobile) for various design concerns including minimizing the danger of the inventive mixture IM spilling, catching fire, and/or releasing toxic vapors if an accident occurs. Most of these design concerns regarding the on-board storage vessel 1 are similar to the design concerns for a conventional (vehicle or on-board) fuel tank storing diesel, gasoline, or gasoline-alcohol fuel mixtures. Therefore, few if any changes in the current approach to designing a vehicle fuel tank and/or vehicle attachment may be needed for a storage vessel 1 designed to store an inventive mixture IM, especially applications having low concentrations of an ammonia component of the inventive mixture. Some potential exceptions include changes to some materials of construction and fuel pump capabilities, especially for somewhat higher ammonia concentrations.

Factors that may include storage vessel cost, safety and performance considerations are expected to initially result in lower concentrations of ammonia (e.g., less than about 0.3% ammonia by wt) in some inventive mixtures IM. In addition to ammonia concentrations being dependent upon obtaining one or more desired emission reductions, the initial concentrations of ammonia in the inventive mixture IM may also be at least partially dependent upon minimizing modifications needed for specific vehicle applications and allowing the use of inventive mixtures in various conventional vehicles with little or no modifications, e.g., compatibility of the inventive mixture with typical and/or conventional fuel tank and fuel system's materials of construction, maintaining the range and fuel economy of a conventional vehicle, avoiding the need to change storage vessel capacity or location within the vehicle, and acceptable levels of evaporative emissions, leakage, and/or spillage risks.

For some applications, the storage vessel 1 may also include other risk-reducing apparatus and/or attached equipment, e.g., devices that indicate the maximum fill level in the storage vessel to prevent overfilling & spillage. Still other vessel apparatus examples include added protective coatings, zero leakage seals, double or triple wall construction, an attached elastomeric storage bladder within the storage vessel containing a volume that expands or contracts as the stored inventive mixture IM is withdrawn or refilled, impact absorbing devices attaching the storage vessel 1 to the vehicle, inlet/outlet ports with emergency isolation valves, and additional ammonia-absorbing fluid storage and emergency distribution apparatus. For still other applications (e.g., in unmanned vehicles) where further risk of spillage or leakage may be acceptable, a smaller and less protected storage vessel 1 may be acceptable even with higher concentrations of ammonia.

The storage vessel 1 may also be cooled or thermally insulated. Insulation may be desired for higher concentrations of the ammonia component in order to control the maximum expected operating temperature and vapor pressure within the storage vessel 1. For example, the insulation may further limit any heat transfer from engine 9 and exhaust gases EE to the stored inventive mixture IM within the storage vessel 1.

A temperature sensor and controller may be integrated into an optional circulator/controller 2 or other means for controlling temperatures within the storage vessel 1. Upon sensing an unacceptably high temperature within at least part of the storage vessel 1, the circulator/controller 2 activates the integrated circulator and/or other cooling device that cools and/or circulates at least portions of the stored inventive mixture IM in order to limit the maximum operating temperature and pressure. For example, cooling could be accomplished using a thermoelectric cooling device in the circulator/controller 2 or a heat exchanger transferring heat from the stored inventive mixture IM to a cooler fluid, e.g., ambient air, coolant from an engine cooling system, and/or a refrigerant from a vehicle's air conditioning system. In another alternative embodiment, a similar controller/cooling device is located outside of the storage vessel 1, e.g., in the fluid pre-treatment device 5 or other locations in the pressurized fluid stream PFM and/or vapor stream VS.

If the inventive mixture IM in the storage vessel 1 tends to have more than one liquid layer or liquid-like layer, other modifications to storage vessel 1 and/or fluid handling systems may be required. This may include a continuous circulator 2 or other means for agitating/mixing the contents/liquid phases of the storage vessel 1. The means for agitating/mixing 2 may be combined with a pump/mixing means 3 (perhaps with fluid return lines) or other means for pressurizing that may also agitate and control thermal conditions of the fluid layers or fluid-like materials, e.g., re-circulating, mixing, and pressurizing one or more liquid phases with a slurry or emulsion. A circulator 2 may also be needed or desired to prevent temperature stratification and/or to avoid adverse impacts that might occur if temperature stratified portions are withdrawn from the storage vessel 1. In an alternative embodiment, separate or supplemental pumping/mixing means similar to the pump/mixing means 3 may be located external to the storage vessel 1. Other components that may be needed include temperature controls and, if mixing or agitation cannot be readily accomplished, separate fluid layer withdrawals and handling of non-homogeneous, generally liquid stream portions may be needed.

It will be understood by those skilled in the art that the storage vessel 1 may also include still other related equipment and/or apparatus, e.g., flash arrestors, access or other ports, burst discs, vapor absorption canisters, level sensors, pressure transducers, shock mounting devices, drain valves, spill containment barriers or enclosures, and other related devices. An alternative embodiment uses multiple, interconnected storage vessels (having manifolded fluid outlet ports) to form a (combined) fluid storage vessel 1.

The design pressure of the storage vessel 1 will be dependant at least in part upon the specific amounts and constituents of the fuel mixture as well as the vehicle application. For example, the design pressure of inventive mixtures IM containing initially small amounts of ammonia (e.g., <0.3% ammonia by wt. and less than 10% alcohol) may be about the same as current design pressures for conventional 90/10 gasoline/alcohol mixtures. In addition, a carbon canister-type evaporative emission control system typical of conventional automotive fuel systems may not be optimum, but sufficient to control substantial evaporative emissions from initial inventive mixtures. However, because of the toxic nature of ammonia, the preferred storage vessel 1 for some applications having larger ammonia concentrations is a leak-tight, pressurized vessel. A preferred, pressurized storage vessel would generally prevent the escape of vapors from within the vessel to the ambient environment under normal filling and operating conditions, e.g., by using emission control devices better able to capture ammonia vapors, fill/vent valves and/or quick disconnects at the fill port FP.

In an alternative embodiment for storage vessel 1, a heat pipe or other "one way" heat-transfer device could be used in conjunction with added insulation to maintain lower temperatures of the inventive mixture. For example, the lower end of a sealed cylindrical heat pipe or thermosiphon (contacting the inventive mixture in an alternative storage vessel) with a separate pure ammonia charge sealed within the heat pipe (or containing other fluids that can evaporate at the bottom of the heat pipe and condense at top under desirable temperature and pressure conditions, with the condensate returning to the bottom of the heat pipe by gravity) acting as an evaporator of liquid within that lower end of the heat pipe cylinder. The liquid evaporation within the heat pipe removes heat from the inventive mixture. The heated ammonia vapors within the heat pipe are allowed to rise to the top of the heat pipe cylinder which (e.g., in conjunction with attached fins and/or radiators) acts as a condenser of the sealed ammonia vapors within the top end of the heat pipe and discharges the condensing heat to the ambient environment. The condensed liquid at the top inside the heat pipe runs down to the lower end by gravity to be evaporated again within the heat pipe. The heat pipe acts to efficiently discharge heat into the ambient environment (at the top) as long as the ambient environment is cooler than the stored inventive mixture in the alternative storage vessel. But because the condensed liquid in the sealed heat pipe cannot run uphill, the heat pipe does not efficiently transfer heat from the ambient environment (at the top of the heat pipe) to the inventive mixture. Thus, the inventive mixture in an insulated storage vessel 1 with heat pipes can be kept at a temperature near the lowest ambient temperature of the day and avoid unacceptable vapor pressures due to much higher average or maximum daily ambient temperatures. A similar type of one-way heat pipe (called a Cryo-Anchor) is used to cool and maintain permafrost conditions in soils supporting the Trans-Alaska Pipeline foundations even during summer conditions when daytime temperatures can rise well above freezing but nighttime temperature are still frequently below freezing, i.e., the heat pipe only efficiently transferring heat out and cooling the foundations, not heating the foundations.

In the embodiment shown in FIG. 2, a portion of the gas or vapors within the storage vessel 1 are withdrawn through tubing or piping as a generally vapor stream VS. The composition of the vapor stream VS is generally not the same as the generally liquid portion LPA of the inventive mixture that is supplied to the engine 9 or the same as the inventive mixture IM stored within the storage vessel 1, e.g., the vapor stream is enriched in ammonia. At least a portion of the vapor stream VS is injected (or aspirated using jet pump 10) into an intake air stream AA to be directed to engine 9 as engine intake air and vapor stream AI. The injection of the vapor stream VS into the air intake AA may be needed in applications where little or no ammonia-enhanced stream is needed to reduce emissions at the exhaust treatment device 11, e.g., where vapor removal from the tank is desired for other reasons. For example, the ammonia-containing fluid stream AI may be incompletely combusted allowing some portion of the ammonia component to be discharged into the exhaust stream EE where it can be used as a NOx reductant with the exhaust gases (with unburned ammonia) supplementing or replacing the injection of a separate ammonia-enhanced vapor stream into the exhaust gases. Lack of or partial combustion of the ammonia may be achieved by maintaining an insufficient air-fuel ratio allowing ammonia and/or decomposed hydrogen & nitrogen to be discharged into the exhaust gases along with combustion gases.

As an option shown, the vapor stream VS can be split a portion aspirated and another exhaust vapor portion V1 directed to an exhaust emission device 11 and/or the engine exhaust stream EE as part of a NOx removal process, e.g., in conjunction with a DeNOx or SCR catalyst in the exhaust emission device. Depending upon pressures within the exhaust emission device 11, a means for pressurizing the split exhaust vapor portion V1 may also be needed. In this optional embodiment, the vapor stream portion V1 would supplement or replace the exhaust vapor stream VPA1 coming from the vaporizer/separator 6 as later discussed. In another embodiment, a portion of the vapor stream VS could also be cooled and returned (e.g., as air-cooled vapor and/or condensate) to the storage vessel 1 if vapor pressures and temperatures in the storage vessel exceeded desired limits, similar to the return fluid RF shown in FIG. 1.

In another alternative embodiment, the mixed discharge from the jet pump/carburetor 10 discharging the engine intake air stream A1 is at least in part directed to the exhaust emission device 11 and/or exhaust gas stream EE upstream of the exhaust emission device. Depending upon the discharge-stream fluid concentrations and the types of catalysts that may be used in the exhaust emission device 11, the mixed air and ammonia-enriched discharge stream A1 may be injected/mixed with the exhaust gases downstream of a first catalyst and upstream of another catalyst within the exhaust emission device.

As shown in FIG. 2, a generally liquid stream portion PFM is withdrawn from an ammonia-containing inventive mixture embodiment IM from the storage vessel 1 using fuel pump 3 and/or other pumps. The liquid stream PFM is fluidly transferred through fluid tubing 4 or other fluid ducting/connecting means to a liquid pretreatment device 5 and the pretreated fluid stream is discharged into a vaporizer/separator 6. Although concentrations of components of the generally liquid stream PFM may not the same as the inventive mixture IM, essentially all of the listed components are also typically present in the generally liquid stream. However, the ammonia concentration of the pressurized, generally liquid stream PFM is typically less than the concentration of ammonia in the inventive mixture IM, especially for initially preferred small concentrations of ammonia in the inventive mixture.

In an alternative embodiment, the fuel pump 3 would be replaced or supplemented with another means for pressurizing and/or controlling the pressure of one or more fluid streams at one or more stream locations. For example, a different operating pressure may be needed in the vaporizer/separator 6 than the operating pressure needed to inject fluid streams into a pre-combustion 9A or combustion chambers 9B, thus at least two means for pressurizing or pressure control means at different fluid flow locations may be needed instead of the one pump 3 shown.

As shown in FIG. 2, the generally liquid, pressurized fluid mixture PFM is introduced into an optional fuel filter or other fluid pretreatment device 5 before entering a vaporizer/separator 6 or other means for separating or extracting a first, generally gaseous, ammonia-enhanced stream VPA from the pressurized fluid mixture and a second, generally liquid, ammonia-diminished concentration stream LPA. Although a fluid pretreatment device 5 is not required, it is preferable in some applications, e.g., a filter included in a pretreatment device to avoid contamination of or damage to downstream fluid components. In alternative embodiments, the fluid pre-treatment device 5 may include fluid pre-heaters and/or means for further enhancing the ammonia content of the ammonia-enhanced vapor stream VPA, e.g., by stripping out non-ammonia components and/or producing additional ammonia in a synthetic ammonia production process as previously discussed.

Similar to the fill port FP described and shown in FIG. 1, the fill port FP or other means for transferring fluid in the embodiment shown in FIG. 2 is generally used to transfer the inventive mixture IM into the storage vessel 1. The fill port FP may be similar to current automotive tank fill ports that also allow vapor recovery. The returning fuel (e.g., with gasoline, alcohol, and/or ammonia components) vapor stream is allowed to flow in a generally opposite direction from the filling stream through the fill port FP back to the fueling facility FF as shown in FIG. 1. However, because of the potential for increased risk handling the inventive mixture IM (especially for higher concentrations of ammonia or other first components), a more leak-tight fill port FP and matching port on the fueling facility may be desired. For example, corresponding (facility and vehicle) quick-disconnect couplings can be used at the fill port FP. In an alternative embodiment, separate vapor recovery and liquid fill ports (and associated quick disconnects) are provided on-board the vehicle as well as at the fueling/dispensing facility.

A means for heating or heater 7 within the vaporizer/separator 6 in the embodiment shown in FIG. 2 is an electric resistance heater connected by wires and powered by an on-board electrical system (not shown for clarity), but other means for heating may also be used, e.g., a shell & tube heat exchanger with the exhaust gases on the shell side and the inventive mixture inside heat exchanger tubes, a fuel-fired heat exchanger, or other heat source to supplement (e.g., during cold starting times) or replace the heat supplied by the electric heater 7 within the vaporizer/separator 6. In another alternative embodiment, a heater can be added to the fluid discharge piping 4 or other fluid handling apparatus to supplement or replace the heater 7, e.g., a strip electrical-resistance heater attached to the piping 4.

In the embodiment shown in FIG. 2, as the pressurized fluid stream PFM is heated by heater 7 within the vaporizer/separator 6, a mostly-vapor stream VPA is evolved and withdrawn from the vaporizer/separator while the remaining mostly-liquid stream portion LPA is withdrawn separately from the vaporizer/separator. Although a heated vaporizer-type of separator 6 is used in the embodiment shown, other types of fluid separators may also be used to replace or supplement this type of vaporizer/separator, e.g., a packed column, a distillation tray device (modified for vehicle applications), an absorbent/regenerative process vessel, a centrifugal-swirl separator, a vacuum extractor, or a reduced-pressure flash separator. Some of these other vapor separators may require added related equipment, e.g., a means for repressurizing at least a portion of the fluid mixture from a flash separator. In another alternative embodiment, only a portion of the pressurized fluid mixture PFM is directed to the vaporizer/separator 6 with the remaining portion flowing from the storage vessel 1 and bypassing the vaporizer/separator 6 before entering the engine 9.

It will be understood by those skilled in the art that several stages and/or types of distillation/ammonia purification or other forms of separation may be needed to attain the desired concentrations/purities of ammonia in one or more fluid streams, e.g., one or more steps of condensation and re-boiling of the vapor stream VPA withdrawn from the vaporizer/separator 6. For example, a packed column with a countercurrent liquid flow may distill a vapor stream VPA and/or strip it of most of a second or carrier component (such as water) so that the composition of the outlet vapor stream is at least about 90% ammonia. Other process alternatives for further purifying the vapor stream VPA include bubble distillation and absorption apparatus, e.g., removing impurities. In general, the size of a packed column (or perhaps the number of bubble tray stages for stationary engine applications) is expected to be dependant upon the specific components and concentrations of the inventive mixture as well as the purity desired. Alternative and/or supplemental separation apparatus may include: fractional distillation, solvent extraction, degasification, scrubbers, strippers, selective diffusion through a barrier, and a swirling chamber or other apparatus that applies a substantial centrifugal force to separate a heavier liquid from a less dense liquid and/or a much less dense vapor mixture.

In another apparatus embodiment using water as a second component of the inventive mixture IM, the fluids in the vaporizer/separator 6 and/or the vapor stream VPA may also be contacted with metal nitride to generate addition amounts of ammonia in the vapor stream VPA by a synthetic ammonia production method discussed previously. For example, means for injecting metal nitride particles into a water-containing vapor stream VPA under some conditions can generate increased amounts of ammonia. After the particle injection and ammonia producing reaction in the VPA stream portion, downstream filters could remove and/or recover metal oxides or other solids that may be present in the fluid stream portion before the generally vapor stream enters the exhaust emission device 11, the engine 9, or other uses of the ammonia-enriched stream portion.

In another alternative embodiment, the functions of the vaporizer/separator 6 and storage vessel 1 are integrated into a modified vessel that acts as a combined storage/vaporizer/separator vessel. In other words, storage, heating, and separation are accomplished within a modified vessel that replaces storage vessel 1, separator/vaporizer 6, and the interconnecting fluid conduits and related apparatus. The modified vessel is supplied with an inventive mixture IM through a fill port similar to the fill port (FP) of the storage vessel 1, but the outlet streams of the modified storage vessel would be similar to the VPA and LPA streams derived from vaporizer/separator 6 shown in FIG. 2. Heating to vaporize a portion of the inventive mixture IM in the modified vessel may be supplied by an electric power source, hot exhaust gases or other heat source options previously discussed. The modified vessel may also be able to omit the fuel pump 3 by using the increased vapor pressure generated by a heat source, increasing the fluid pressure within the modified vessel sufficiently to inject a fluid stream into engine 9.

If the inventive mixture IM has more than one liquid layer and/or is not completely mixed in the storage vessel 1 in the embodiment shown in FIG. 2, another alternative apparatus embodiment provides a plurality of generally liquid outlet streams (e.g., from different portions of the storage vessel) with associated ducting to transfer the multiple liquid stream portions to the engine 9 and/or mix the streams prior to use in the engine. For example, a flexible hose attached to a floating outlet port (with associated optional filters, heaters, coolers, vaporizer/separators, pumps and/or other fluid handling apparatus similar to that described for other embodiments herein) may draw fluid from an upper layer and be fluidly connected to the engine 9. A second outlet port drawing fluid from a lower layer (presumably having a different composition and/or different properties from the fluid drawn from the upper layer) could also be fluidly connected to the engine 9. For example, two or more fuel streams (e.g., one from each layer) would be injected into a combustion chamber of engine 9 with injection controls allowing various fuel-fuel and total fuel-air mixture ratios. Fuel injection control may also allow only one or another fuel to be combusted in the engine 9, similar to some conventional dual fuel vehicle configurations. As a further option in this alternative embodiment, the multiple fuel streams may also be further separated and/or remixed prior to being used, e.g., as a fuel and/or as a reducing agent.

A multiple (or dual) generally liquid fuel embodiment may also have a still further modified fuel injection control that also accounts for any fuel aspirated into the engine 9 along with intake air AI. For example, the engine 9 may be switched from running on injected fuel derived from each layer or switched to a single liquid fuel stream supplemented with some of a fuel vapor stream at least partially aspirated into the intake air AI. Fuel control may also require additional or modified sensors, e.g., sensing the quantity of each layer remaining in storage vessel 1.

In another alternative embodiment, essentially all of the pressurized fluid mixture stream PFM is vaporized in a vaporizer similar to the vaporizer/separator 6 shown. If exhaust gas is used as the source of heat to vaporize the fluid stream PFM, an increase in overall thermal efficiency is possible. This may be especially true if ammonia is a substantial constituent of the inventive mixture IM.

In another embodiment similar to the just described alternative embodiment, a modified vaporizer/separator (similar to the vaporizer/separator 6) is relocated to be directly attached to the exhaust emission device 11 or integrated with the engine exhaust stream EE ducting or other related apparatus. This embodiment minimizes the ducting needed to transfer hot exhaust stream gases EE to a spaced-apart heater (e.g., located within a vaporizer/separator 6 spaced-apart from exhaust gas stream EE), but may extend the PFM fluid handling and transfer components when compared to the embodiment shown in FIG. 2. If the concentration of the first component (e.g., ammonia) is low and the vapor stream small, the location of the modified vaporizer/separator in the exhaust stream EE may have significant advantages, e.g., allowing low, even otherwise unacceptable RVP mixtures to have acceptable ignition characteristics after heating. If a supplemental heater is used in conjunction with the exhaust stream heat exchanger (e.g., a supplemental electric heater), acceptable cold starting characteristics may be obtained even with inventive mixtures having otherwise unacceptable cold start characteristics. In this embodiment, the supplemental heater would vaporize the mixture during initial cold start-up and prior to attaining sufficiently high temperature exhaust gases to at least partially vaporize the mixture. Other optional devices may also be included in vaporizer/separators such as baffles at the outlet of the vapor stream VPA to minimize droplet entrainment. In mostly vaporized mixture embodiments, a remaining liquid stream LPA, if any, may be injected into the engine 9 as shown, but may also be returned to the storage vessel 1 or otherwise used.

In a related alternative embodiment, an ammonia-enriched vapor stream (e.g., a portion of the vapor stream VS) may be further heated in a heat exchanger, e.g., using a portion of the exhaust emission stream EE as the hot fluid. If the resulting temperature of the ammonia-enriched vapor stream is sufficient to at least partially decompose the ammonia into hydrogen and nitrogen, the decomposed stream may be used as a source of hydrogen. The hydrogen may be used in a fuel cell or other non-combustion uses, e.g., to generate electrical power to supplement the power output of engine 9.

Using one ammonia-alcohol-heavy gasoline inventive mixture (heavy gasoline defined in this embodiment as having an RVP of no more than 6.5 psi and an T10 boiling point of at least 135° F.), the separated vapor stream portion VPA of the inventive mixture IM may contain a greater concentration of ammonia (i.e., is ammonia-enriched) than the PFM stream supplied from the storage vessel 1, e.g., because of the lower boiling point of the ammonia content when compared to many alcohols and the initial boiling point of the heavy gasoline components. Depending upon factors such as the concentration of each component of the fuel mixture, the efficiency of ammonia separation in the vaporizer/separator 6, the operating temperature and pressure of the vaporizer/separator, and the engine performance and emission requirements, the ammonia concentration in the separated vapor portion may vary, e.g., preferably at least half of the vapor stream VPA by weight consisting of ammonia. However, the ammonia concentration in vapor stream VPA is preferably greater than about 70 percent in some applications, more preferably greater than about 85 percent, and still more preferably greater than about 90 percent by weight, especially if the stream is to be used as a reducing agent in some exhaust emission stream applications.

For the embodiment shown in FIG. 2, the vapor stream portion VPA is optionally split into several vapor stream portions, e.g., VPA1, VPA2, VPA3, and VPA4. A first or exhaust stream portion VPA1 is discharged into an exhaust treatment device 11 located in the engine exhaust stream EE, e.g., as a reducing agent to control NOX in conjunction with a three-way, SCR, and/or DeNOx ceramic catalyst. Alternatively, the 1st stream portion VPA1 is discharged into the engine exhaust manifold upstream of the exhaust treatment device 11. The 2nd and 3rd vapor stream portions, VPA2 & VPA3 are discharged to heat exchangers 8 and pre-combustion and combustion chambers 9A & 9B. The auxiliary vapor stream portion VPA4 is discharged to an auxiliary fluid-consuming device 13.

One example of a catalyst that may be used within the exhaust treatment device 11 (and typically downstream of where the ammonia-enriched stream VPA1 is mixed with the exhaust stream EE) is a honeycomb-shaped $TiO_2WO_3V_2O_5$ ceramic. Alternatively, a three-way catalyst is preferred for some applications. For example, if the ammonia concentration in the inventive mixture IM is about one percent or less, the first vapor stream portion VPA1 may constitute a great majority of the total vapor stream VPA with little of no VPA2, VPA3, & VPA4 stream amounts. As the ammonia concentration in the inventive mixture IM increases, the VPA1 vapor portion of the total vapor stream VPA is expected to generally decrease.

An optional vapor stream portion VPA4 of the vapor stream VPA is diverted to a non-combustion or alternative fluid-use device 13. An alternative use device 13 can be used directly to supplement the power output from the engine 9, e.g., the alternative use device may be a fuel cell, an internal combustion engine operating primarily on ammonia vapors, a bottoming ammonia/ammonia-water mixture in a Kalina cycle engine producing additional power, or the alternative use device can be used for recharging an ammonia-based air conditioning system or other non-combustion uses. The alternative use device 13 may also include a means for decomposing ammonia (into hydrogen and nitrogen) and a hydrogen consumptive device, e.g., an alkaline fuel cell.

In addition to the option of recharging an ammonia Rankine cycle or Kalina cycle engine (e.g., see U.S. Pat. Nos. 4,489,563 & 5,572,871), the heated and pressurized, ammonia-enriched stream VPA4 may become part of a modified Kalina cycle that uses a carrier fluid mixture, e.g., water-ammonia. As an example of an alternative use device 11 using the Kalina Cycle, see FIG. 1 in "The Kalina Cycle Bottoming Cycle for Diesel Combined Cycle", dated May 15, 2001, published by Exergy, Inc., Hayward Calif. (hereinafter, Kalina reference), the vapor stream VPA4 (shown in FIG. 2 herein) would replace the stream labeled "From Heat Acquisition" shown in FIG. 1 of the Kalina reference, the non-combustion device 13 (shown in FIG. 2 herein) would replace the turbine-generator symbol and "DCSS" components shown in Kalina reference, the optional fluid return FR leading to the exhaust emission device 11 (shown in FIG. 2 herein) would replace the line out of the DCSS unit shown in the Kalina reference, the heat exchanger in the exhaust emission device 11 (shown in FIG. 2 herein) would replace the "Ambient Cooling" shown in the Kalina reference, and the RF stream would replace the "To Heat Acquisition" stream shown in the Kalina reference.

Other vapor stream portions VPA2 and VPA3 shown in FIG. 2 are split from the ammonia-enriched vapor stream VPA coming from the vaporizer/separator 6 and are diverted to a pre-combustion chamber 9A within or attached to engine 9. In the embodiment shown, the vapor stream portions VPA2

& VPA3 are further heated by using combustion exhaust gases in pre-combustion heat exchangers 8 before the heated vapor stream portions are discharged into the pre-combustion chambers 9A before the combustion exhaust gases are discharged through discharge port D. The pre-combustion chambers 9A are used to heat and mix first liquid fuel portions LPC using the heated vapor streams VPA2 & VPA3 portions of vapor stream VPA from the separator/vaporizer 6. In another embodiment, at least a portion of the liquid stream portions LPC and/or LPB are derived from another liquid fuel supply instead of only from the liquid stream LPA from vaporizer/separator 6, e.g., a separate source of fuel and/or reducing agent is used.

The heated vapor stream portions from the pre-combustion heat exchangers 8 will tend to vaporize the liquid stream portions LPC and/or LPB in pre-combustion chambers 9A and/or combustion chambers 9B. In an alternative embodiment, the pre-combustion chambers 9A may be used to thermally decompose a component, e.g., decompose ammonia to hydrogen and nitrogen gases, and combust at least a portion of the decomposed gases. Alternatively, a portion of the decomposed gases can be diverted to a non-combustion use.

The vapor and liquid stream temperatures and A/F mixture ratios entering engine 9 can be varied to optimize performance and/or minimize exhaust emissions from the engine. In Otto cycle engines, the air-fuel (A/F) ratio using the inventive mixture is expected to increase when compared to currently typical or conventional baseline-vehicle ratios with catalytic converters to control NOx instead of reductant injection into the exhaust gases, allowing leaner, more complete, and more fuel-efficient combustion. Compared to typical or baseline vehicle controls on Otto cycle engines, leaner A/F ratios tend to be more efficient and produce less HC and CO emissions, but produce small increases in NOx emissions without further treatment. However, the combustion of a portion of the inventive mixture plus the mixing of the ammonia-enriched stream VPA1 in the exhaust gases can reduce NOx and can more than make up for any small increases in NOx emissions from the engine due to the leaner A/F ratio. The addition of ammonia to a HC fuel component combusted in engine 9 can also reduce CO and $CO_2$ emissions as well as NOx.

Conventional diesel engines can operate over a range of A/F ratios. Although the addition of easily vaporized alcohol and ammonia along with the optimization of fuel injection/combustion controls may result in improved cold start and steady state efficiency while reducing PM and NOx emissions, engine modifications, and/or additional inventive mixture components may be required, especially for larger ammonia concentrations. For example, improved fuel injection/combustion controls over a range of operating conditions may require a motor-driven turbocharger. Improved combustion characteristics may also result if non-homogeneous mixtures of fuel & air are created within the combustion chamber, e.g., a ring of an ammonia and/or alcohol-enriched fluid stream is separately injected near the walls of the combustion chamber and/or ammonia is aspirated and mixed with intake air prior to the compression stroke and other fuel injection into the diesel combustion chamber. It is noted that the auto-ignition temperature of ammonia is comparable to the compression temperatures reached in current typical Diesel cycle engines, ~600° C.+, thereby avoiding substantial pre-ignition of an aspirated ammonia component and allowing good aspirated fuel-air mixing of this fuel component. It is also noted that the A/F ratio for just this ammonia fuel component is typically outside the flammability range, further avoiding pre-ignition before the remainder of the fuel being injected. Thus, improved air/(ammonia vapor) fuel premixing can improve fuel efficiency without the risk of pre-ignition in a diesel engine.

As an option for the embodiment shown, FIG. 2 shows an aspirator 10 used to draw vapor stream VS from the storage vessel 1 into the engine 9. An example of an aspirator 10 is a carburetor typical of older Otto cycle automobiles (e.g., produced prior to the 1970's) where a venturi is used to lower the static air pressure of the intake air stream AA (the reduced static pressure at the venturi throat drawing the fuel stream, VS in this case, into the air stream) and the resulting air-fuel mixing occurring before the mixed stream AI enters the engine 9. The use of a venturi with the intake air stream may have other advantages in potentially creating a negative pressure (less than atmospheric pressure) within at least portions of the vapor stream VS piping, thereby minimizing the risk of leakage of ammonia-containing fluids into the environment. Alternatively, an aspirator may also be used to lower the pressure on VPA and/or LPA streamlines and apparatus. Although Diesel cycle engines typically do not mix fuel and air prior to engine compression, dual fuel injection and/or fumigation is known to one skilled in the internal combustion/Diesel engine arts, further potentially increasing fuel efficiencies.

In the embodiment shown in FIG. 2, the vapor streams VPA2 & VPA3 are heated in heat exchangers 8 and injected into pre-combustion chambers 9A. As an option, the pressurized liquid streams LPC may also be injected into pre-combustion chambers 9A. The heated vapor streams in pre-combustion chambers 9A tend to increase vaporization of the liquid-vapor mixture in the pre-combustion and combustion chambers 9A & 9B. The further vaporized liquid and gaseous mixture from the pre-combustion chambers 9A may also be injected separately in combustion chambers 9B or optionally mixed with at least a portion of the liquid fuel streams LPB and the mixture combusted in the combustion chambers.

In the embodiment shown in FIG. 2, the total fuel supplied to the IC engine 9 comprises the air-aspirated vapor stream VS plus the generally liquid streams LPB & LPC plus the generally vapor streams VPA2 and VPA3. As used herein, the fuel supplied will be defined as combustible fluids in the fluid streams supplied to a combustion engine and generally combusted. In alternative embodiments, other fuel sources may be supplied, e.g., recovered ammonia-containing fluids RF from the engine exhaust stream EE or fuel from other sources may be directed to the engine 9. However, embodiments having only a single injected source of fuel for each combustion chamber are initially preferred for Otto cycle engines to minimize cost and development efforts.

In another alternative embodiment, only a portion of the vapor stream VS is injected or aspirated into venturi 10 and other portion(s) diverted to the exhaust emission device 11, to pre-combustion chambers 9A or to other uses. As another option, the alternative use(s) of the vapor stream VS and/or direct aspiration of storage vessel vapors using venturi 10 may avoid the need for the vaporizer/separator 6.

Few modifications from a gasoline-fueled, baseline engine may be needed for initial embodiments that use inventive mixtures IM with small amounts of ammonia and inject portion(s) of the inventive mixture into each combustion chamber to create lean air-fuel mixtures (lean being defined herein as an amount of air greater than the stoichiometric amount needed to theoretically completely combust the amount of fuel being combusted, the stoichiometric amount being defined as having a Lambda equal to 1 and a lean amount being defined as having a Lambda greater than 1. Preferably, the Lambda for inventive apparatus using inventive mixtures is at least 1.01 (or in other words, using 1 percent excess air for theoretically completely combusting the portion of the inventive mixture being combusted), more preferably at least about 1.03 (i.e., using 3% excess air) and still more preferably at least about 1.05 to obtain improved fuel efficiency as well as reduced CO and HC exhaust emissions. Increased Lambda values (e.g., having a Lambda value of at least about 1.1) may also be used over at least a portion of the range of operating conditions, e.g., if reduced HC emissions is an important requirement.

The generally liquid combustion fuel may be supplemented with small amounts of a vapor stream VS aspirated into the intake air A1, e.g., in Diesel cycle engines when VS has a high concentration of ammonia or other materials having relatively high self-ignition temperatures and/or when the air-fuel mixture ratio during the compression stroke is above flammable limits. For example, an ammonia-enriched vapor stream may be mixed with the intake air (i.e., air to be combusted with fuel in the engine 9) either upstream or downstream of an air compressor or other turbo-charging device, but prior to when the majority of fuel is injected into a combustion chamber.

In an alternative embodiment, if sufficient vapor stream VS pressures and temperatures are available from storage vessel 1 or other means for pressurizing the vapor stream VS, the vapor stream can be injected directly into combustion chambers 9B along with the liquid fuel stream LPA instead of being aspirated with the intake air AA as a fuel-air mixture AI. The vapor stream VS may also be supplemented or replaced by portions of the pressurized vapor stream VPA. Selection among these vapor, liquid, and aspirator injection embodiment options will at least in part depend upon the specific components of the inventive mixture, engine cycle and design, the operating pressures of the storage vessel 1 and vaporizer/separator 6, and safety considerations handling stream(s) of air and/or inventive mixture portions.

As shown in FIG. 2, the first portion of the generally vapor stream VPA1 is used in an engine emission control device 11 in the exhaust stream EE. Other means for supplying or supplementing the reductant component (and/or at least a portion of one or more other components of the inventive mixture that may also act as a reductant) injected into the exhaust gas stream include a separate supply of a reductant (e.g., urea injection) and supplying unburned ammonia or other reducing components to the exhaust. For example, unburned ammonia may be obtained by separate injection of ammonia-enriched stream into a portion of the combustion chamber having excess or insufficient air for combustion or adding a non-combustible material that shields some portion of the ammonia constituent until combustion is no longer likely. Obtaining sufficient unburned ammonia or other reductant may also require changes to fuel injection patterns and combustion chamber design.

Depending at least in part on exhaust gas temperatures in the exhaust system and the presence of HC vapors, if any, in the ammonia-enriched vapor stream VPA1, mixing of several NOx reductants may occur in the exhaust gas stream EE upstream of a catalyst in the emission control device 11. For example, adding a reductant (such as ammonia) to hot exhaust gases can result in a Non-Catalytic Selective Reduction (NCSR) of NOx. When combined with Selective Catalyst Reduction (SCR), e.g., in a catalytic converter, substantial conversions of NOx into mostly water and nitrogen can occur prior to discharge of the reduced-NOx exhaust gas stream EEA into the ambient air, similar to the previously described for the embodiment shown in FIG. 1.

It will be understood by those skilled in the art that stratification, removal of variable amounts of the vapor stream VS from storage vessel 1, and/or return of the return fluid RF can result in significant differences over time in the composition of the mostly liquid stream PFM drawn from a potentially varying composition of the stored, but depleting amount of inventive mixture. After a mostly vapor phase stream VPA is removed from the pressurized fluid stream PFM at vaporizer/separator 6, it will also be understood that the generally liquid phase stream LPA withdrawn from the vaporizer/separator 6 does not necessarily have the same composition as the generally liquid stream PFM withdrawn from the storage vessel 1. The differences may require additional sensors and controls to adjust for compositional differences over time. However, in the initially preferred embodiment with small amounts of ammonia in the inventive mixture, these additional sensors and controls are expected to be limited or not required.

In an alternative embodiment, the inventive mixture IM stream is aspirated and/or injected into a combustion chamber without any portion vaporized, separated, or removed if a means for mixing uncombusted ammonia and/or ammonia decomposition products to the exhaust emission stream EE is provided, e.g., using unburned ammonia and/or ammonia components in the engine exhaust as a reducing agent to limit NOx exhaust emissions. Unburned ammonia and/or its thermal decomposition products may be generated for example by maintaining air-fuel ratios outside the ammonia combustion limits or providing insufficient air for complete combustion.

It will be understood by those skilled in the art of IC engine combustion chamber design that optional pre-combustion and/or combustion chambers 9A and/or 9B of the engine 9 may be fluidly connected, but generally separated chambers or they may be generally open to each other with different portions/shapes within a larger combustion chamber. It will also be understood by those skilled in the art that air and/or fuel streams are not typically continuously injected into combustion chambers as steady streams, but injected intermittently into each chamber, e.g., a charge of fuel injected into a combustion chamber from a manifold after a piston has at least partially compressed intake air in the combustion chamber, however, the sum of intermittently injected volumes to multiple combustion chambers making up a somewhat continuous flow of fluids.

It will also be understood by those skilled in the art that other components may be attached or connected to the confining wall portions of one or more combustion chambers or attached otherwise to an engine 9. These other components may include intake and exhaust valves, spark or glow plugs, fluid pumps, carburetors, intake and exhaust manifolds, piston and piston rings, engine body and heads, gaskets, cylinder inserts, coolant and lubrication systems, vapor and exhaust emission reduction devices, fuel and other fluid injectors and related injection controls, and transducers.

If a baseline and/or other typical conventional vehicles and/or IC engines are modified to more effectively use an inventive mixture, the engine modifications may include suitable changes needed to reliably function over extended periods of time, e.g., having the confining wall portions of a combustion chamber of IC engine 9 composed of corrosion resistant materials and otherwise designed to reliably function using portions of the inventive mixture IM as a fuel. Reliable functioning of the engine would include cold and hot starting, stopping, idling, and other anticipated conditions for extended periods of time and/or use, e.g., reliably traveling at least 100,000, preferably 150,000, or more preferably 200, 000 miles before extensive repairs are typically needed. Modifications may also require fuel injector changes (e.g., corrosion resistant and variable in configuration to accept fuels mixtures having a range of compositions), increased structural integrity of fuel storage and/or handling devices, (e.g., to further protect against accidental spillage and/or higher vapor pressures), improved heat exchange characteristics with one or more fuel stream portions, and cylinder/piston shape changes to form pre- and/or multiple combustion chambers. For example, the use of copper or zinc should be avoided in areas that contact ammonia-enriched streams, e.g., avoiding metal gaskets containing copper.

Although four-stroke, spark-induced (Otto) and compression-induced (Diesel) internal combustion (IC) engines are preferred, other IC engines potentially using an inventive mixture include two-stroke, gas turbine, and Wankel engines. External combustion engines may also be used with the inventive fuel mixture. Other engines may include binary fluid engines and processes where combustion gases or other source heat a working or binary fluid (e.g., boiling water into steam) to drive an engine, e.g., steam engines and steam turbines. Although typical automotive Otto-cycle engines are conventionally designed to use baseline gasoline mixtures (such as motor gasolines and/or gasoline-alcohol mixtures) that may be somewhat similar to some inventive mixtures, it still may be desirable to adjust, optimize, and/or modify engine subsystems, e.g., spark/fuel injection timing and emission controls.

Fuel distribution and the dispensing facilities (e.g., automotive service stations) handling the inventive mixture also may require modification from current facilities handling baseline motor gasolines and/or gasoline-alcohol fuel mixtures. For example, added means for mixing may be needed to minimize stratification, added means to avoid water contamination, and modified metering to dispense the inventive mixture. However, little or no modifications may be needed for initial mixtures having less than about one or 2 percent ammonia by weight when compared to inventive mixtures having larger concentrations of ammonia or other first component.

Elements of steam engine technology may also be applied to an inventive apparatus using some inventive mixtures, especially if the inventive mixture IM includes significant amounts of water. For example, the optional heat exchanger shown within the exhaust treatment device 11 using ambient air AA2 flowing from an entry port to a discharge port DA may act as a condenser for cooling and condensing at least some of the water vapor constituent of the exhaust gases. In another embodiment, cooling water (e.g., from an engine cooling system) could be used instead of ambient air AA2 as a cooling/condensing media in the heat exchanger within the exhaust treatment device 11. Alternatively, a condenser may also be spaced apart from the exhaust treatment device 11, e.g., located in the engine exhaust stream EE or treated exhaust stream EEA upstream of the exhaust discharge D. Besides condensing water vapor in the exhaust stream EE, the condenser may also be used to condense or dissolve other fluids that may be carried by a condensable fluid, e.g., some unburned hydrocarbons. Still further, the condenser may also be used to carry or dissolve some particulates and remove the particulates from the exhaust emissions stream EE, e.g., soot or ammonium nitrate particles. As shown, the condensed or otherwise recovered fluid stream RF is returned to the storage vessel 1 e.g., when the inventive mixture IM contains a water constituent and a small portion of the water vapor constituent in the exhaust emissions is recovered. As an option, the recovered fluid stream RF may be diverted elsewhere, e.g., be separately collected, treated, discharged, and/or used in other ways. The recovered recovered/recycled fluid stream RF may also preferentially dissolve some unwanted exhaust gases that would otherwise be non-condensable such as ammonia, further reducing unwanted exhaust emissions such as unacceptable slippage of ammonia discharged to the environment. A filter or other recovered fluid treatment device 12 is an optional device to remove or further remove solid particles or other unwanted components of the recycled stream RF prior to returning the fluid stream to the storage vessel 1 or other use.

In operation, one embodiment of the inventive vehicle apparatus and process shown in FIG. 2 allows a portion of a heated and ammonia-enriched second and third vapor stream VPA2 & VPA3 to assist in the vaporization and combustion of other portions of the fuel supply stream to the engine 9. This embodiment also shows a first stream portion VPA1 injected into an engine exhaust stream EE and aid in the removal of unwanted exhaust emissions. The optional fluid recovered or return stream RF may also carry dissolved emission gases and unburned ammonia gases back to the storage vessel 1. In alternative embodiments, the fluid return stream RF may be discharged to the ambient environment, transferred to a combustion chamber of the engine 9, or directed to other uses.

It will be understood by those skilled in the art that the inventive apparatus, inventive mixtures, and/or inventive processes described herein may not control all unwanted emissions from combustion engines. For example, sulfur limits on inventive mixtures may also be applicable (similar to some conventional fuels) and the inventive mixture, apparatus, and/or processes without sulfur composition limits may not control sulfur dioxide emissions. In addition, the control of one unwanted emission in some applications may adversely impact the control of one or more other unwanted emissions. Using the inventive mixture IM with the apparatus and processes described can be a portion of a more comprehensive emission reduction process.

In another process embodiment, instead of or supplementing separating ammonia from an inventive mixture, relatively pure ammonia is withdrawn from a vehicle air conditioning (AC) unit that uses ammonia as the working fluid, e.g., to be used as a fuel or fuel component in an emergency when other fuel or fuel components on board have been depleted. An ammonia recharging process, could be used to recharge the depleted AC working fluid, e.g., using separated ammonia from an inventive mixture or at a service station.

In a preferred embodiment of an inventive process, a first step is separating an inventive mixture stream into at least two streams, a first fluid stream to be is used primarily as a fuel in an IC engine while a primary use of a second stream is to be injected into the engine exhaust gas stream to reduce NOx and/or other emissions. A preferred first component of the inventive mixture is ammonia or other reductant (i.e., reducing agent) having limited amounts of carbon and a preferred second carrier component is ethanol or other fluid capable of dissolving or carrying a range of reducing agent concentrations and a range of optional third hydrocarbon components. In a first step, the generally vapor stream has a concentration of reducing agent greater than the concentration of reducing agent in the liquid stream.

In a second process step of this embodiment, combusting the generally liquid stream with intake air produces exhaust gases wherein combustion of the first component of the generally liquid component (having little or no carbon) can reduce total $CO_2$ and/or CO emissions in the exhaust gases from an engine when compared to combustion of a baseline fuel, e.g., preferably reducing these emissions by at least about 0.1 percent when compared to the average CO and/or $CO_2$ emissions from a baseline automobile using a baseline gasoline fuel. More preferably, $CO_2$ and/or CO emissions will be reduced by at least about 0.5 percent, still more preferably at least about 2 percent, most preferably at least about 10 percent. If the inventive process is widely used, the emission reductions can have a significant impact on the total unwanted NOx, CO, $CO_2$, and/or other emissions currently being discharged into the atmosphere from IC engines.

A third step in this embodiment is mixing at least a portion of the generally vapor stream with combustion exhaust gases producing mixed gases with an optional fourth step of contacting the mixed gases with a catalyst. Although selective catalytic reduction (SCR) of NOx emissions from combustion gases is known to one skilled in the art, some SCR catalysts (e.g., $V_2O_5$ and $TiO_2$) are not typically found in baseline and/or typical conventional automobile and truck vehicles. For example, three-way catalysts (such as platinum, rhodium, &/or palladium based catalysts) are more typically found in conventional Otto engine-powered automobiles. However, U.S. Pat. No. 5,409,681 discloses that platinum, rhodium and/or palladium catalysts (when used as a second catalytic component with ammonia injection in exhaust gases) can reduce NOx emissions as well as decreasing CO and ammonia emissions.

Although early work by R. K. Lyon of Exxon showed selective non-catalytic reduction (SNCR) of NO using ammonia at exhaust temperatures above 1600° F. (e.g., see U.S. Pat. No. 3,900,554), later work showed substantial SNCR of NOx occurs at temperatures ranging from about 1450-1900° F. (e.g., see "Limits to NOx Reduction by $NH_3$ Injection," J. H. Pohl, S-C Yang, W. A. Sowa & J. W. Dill, Meeting of ACS Division of Fuel Chemistry, Denver, 28 Mar.-2 Apr. 1993). See also the aforementioned R. K. Lyon reference showing SNCR of NO using ammonia and an oxidizable gas (similar to some gasoline components) at temperatures above 1300° F. Since a preferred embodiment of the inventive process will inject an ammonia-enhanced portion (e.g., that may also include oxidizable and/or lighter gases from gasoline for Otto cycle applications) into exhaust gases at temperatures that can be significantly higher than 1300° F. for conventional Otto-cycle exhaust gases but typically less than 1900° F., some amount of SNCR of NOx can be expected for at least some automotive Otto cycle applications. The lighter gases from gasoline are expected to include aromatic compounds, i.e., materials having one or more organic molecules containing a benzene ring. Since the exhaust gas temperatures in Diesel cycle applications may be higher, SNCR of NOx can also be expected in Diesel cycle applications when the reductant-containing stream is mixed with the exhaust gas stream within this temperature range. Other references also show SNCR with and without downstream catalyst, e.g., U.S. Pat. No. 5,609,026.

Although combusting pure ammonia can produce NOx, adding ammonia to gasoline and combusting the mixture in an Otto cycle engine can reduce NOx (when compared to a gasoline fuel) even without separately injecting an ammonia-enhanced stream into combustion exhaust streams. For example, see U.S. Pat. No. 4,166,724. Moreover, the same patent reference shows reductions in HC & CO emissions when compared to emissions using gasoline. Still further, the addition of ammonia to gasoline increases octane ratings, e.g., see U.S. Pat. No. 1,589,885. Thus, an inventive process can generally reduce NOx and other unwanted emissions in many ways, e.g., first by combusting a portion of an inventive mixture that produces less exhaust emissions, second by injecting a reductant component-enhanced stream into the exhaust producing NCSR of some emissions, and third by injecting other components (e.g., alcohol and light hydrocarbons) to reduce or aid in the reduction of NOx in the exhaust, fourth by using a SCR or other catalyst in combination with the reductants in the exhaust, and fifth if an optional condenser is also placed in the exhaust gas stream, condensing and dissolving unwanted gases in the condensate.

In the process of mixing an ammonia-enhanced stream in an exhaust gas stream, the amount of added ammonia and/or other reductants (and some other constituents of the ammonia-enhanced stream) should be controlled based on the amount of NOx to be reduced and to limit unreacted ammonia (and other constituents) that may be discharged. For example, the ratio of ammonia added to nitrogen oxides within the exhaust gas should be no more than approximately 1.0-1.4 (see, for example, U.S. Pat. No. 5,409,681). However, initial embodiments are expected to mix substantially less than this amount of ammonia in order to minimize ammonia emissions. This is especially true if inventive mixtures are used in older existing vehicles without catalysts. Thus, a preferred initial embodiment will have an initial ratio of ammonia added to the exhaust gas to nitrogen oxides within the exhaust gas of substantially less than about 1.0-1.4, e.g., preferably less than about 0.8-1.4 or more preferably less than about 0.5-1.4.

In a baseline vehicle originally designed to combust a baseline or similar gasoline fuel but modified to use an inventive mixture, one process embodiment for reducing exhaust emissions is withdrawing at least a portion of the inventive mixture in at least one stream, separating portions of the inventive mixture stream into at least one generally vapor stream portion and a generally liquid stream portion, combusting the liquid stream portion, and injecting at least a portion of the vapor stream portion into combustion gases. More specifically, the process embodiment comprises the steps of: 1) storing a fluid mixture in a storage vessel, said fluid mixture comprising a) a first component consisting essentially of hydrogen and/or nitrogen elements and b) a second carrier component capable of dissolving a significant amount of said first component; 2) separating at least some of said fluid mixture into at least first and second portions wherein said first and second portions have substantially different concentrations of said first component; 3) supplying a first, generally liquid portion to a combustion engine wherein said engine generates combustion exhaust gases; 4) injecting at least some of a second, generally vapor portion into said combustion exhaust gases to form mixed exhaust gases; and 5) contacting said mixed exhaust gases with a catalyst prior to being exhausted into an ambient environment such that at least one unwanted emission exhausted into the ambient environment is reduced by at least about 5 percent when compared to emissions from a baseline vehicle combusting a baseline fuel. More preferably, NOX emissions will be reduced by at least about 20 percent and still more preferably by at least about 50 percent.

Another process embodiment for reducing exhaust emissions comprises the steps of: 1) storing a fluid mixture in a storage vessel, said fluid mixture comprising a carrier fluid component and a NOx reductant component having comprising hydrogen and nitrogen elements with less than 30% by weight of other elements (hereinafter a Low-C reductant component); 2) separating the fluid mixture into at least a first stream and a second stream wherein the concentration of said Low-C reductant component in said first stream is not the same as the concentration of said Low-C reductant component in said second stream; 3) combusting at least a portion of at least one stream in a combustion engine, wherein said combusting generates combustion exhaust gases; and 4) directing at least a second portion of another stream to a use that does not combust said second portion in a combustion engine.

Another process embodiment for reducing exhaust emissions comprises the steps of: 1) storing a combustible fluid mixture in a storage vessel attached to a transportation vehicle having a combustion engine, said combustible fluid mixture comprising a reductant component consisting essentially of hydrogen and nitrogen elements and a second component for carrying the reductant component, such as an alcohol or alcohol mixture; 2) separating said combustible fluid mixture into at least a generally liquid portion and a generally vapor portion; 3) mixing a first amount of at least a portion of said generally vapor portion with a second amount of an oxidizing fluid (such as air) to form a combustible fluid fuel/oxidizer mixture wherein the second amount of oxidizing fluid is substantially less than the amount needed to fully oxidize the first amount of combustible fluid mixture and/or the temperature of the fuel/oxidizer mixture is below the self ignition temperature of the fuel/oxidizer mixture prior mixing with at least one other portion of the generally liquid portion is also mixed with the fuel/oxidizer fluid; and 4) combusting said first and second amounts in a combustion engine wherein said combusting generates combustion exhaust gases.

A further modification of this alternative process embodiment wherein the combustion exhaust gases comprise at least a significant amount of incompletely combusted first component (including unburned amounts of first component, partially oxidized first component products of combustion amounts, and/or a disassociation product of said first mixture component amounts), the process comprising the additional step of: 5) contacting said combustion exhaust gases with a catalyst. A significant amount of incompletely combusted first component such as ammonia is herein defined as at least about 0.1% of the first amount, preferably at least about 0.5%, and still more preferably at least about 2.0%.

Mixing an ammonia-enriched stream into a combustion exhaust stream, especially in conjunction with catalysts contacting the mixed streams, has been shown to significantly decrease NOx emissions from stationary combustion sources. If the source of the ammonia is unburned ammonia in the exhaust gases, mixing and reducing efficiency should be improved. Still further, mixing an ammonia-enriched stream that includes aromatic hydrocarbons into a combustion exhaust stream has been shown to reduce the exhaust stream temperatures needed to reduce NOx. In addition, combustion of some carrier components such as some alcohols has also been shown to reduce NOx emissions when mixed with gasoline.

In another method embodiment, at least one component concentration or other mixture property of an inventive mixture is selected using a mathematical calculation that is correlated to the amount of one or more emissions produced from an internal combustion engine combusting an inventive mixture having that mixture property. For example, the weight percent of an ammonia component over a range of concentrations can be selected based on a mathematical calculation of estimated nominal $CO_2$ exhaust emissions that would be generated if an inventive mixture having that weight percent were combusted in a nominal IC vehicles. The calculations may also include other parameters, e.g., the estimated nominal amount of ammonia diverted to be used in conjunction with exhaust NOX reduction and the concentration of carbon in the remaining components. Multiple regression analysis may be used to generate mathematical calculations and correlations of inventive mixture properties with emissions from one or more IC vehicles.

In another process embodiment, a process comprising blending at least one unleaded hydrocarbon stream having an initial boiling point at standard conditions of pressure within the range of about 77° F. to about 250° F. with a second stream of ammonia, hydrazine, or a similar reductant component boiling at standard pressure conditions within the range of about −30° F. to about 240° F. and with a third stream of a carrier component boiling at standard pressure conditions within a range of about 70 to 212° F. to produce an unleaded fuel mixture suitable for combustion in an automotive Otto cycle engine, said blending being controlled in accordance with at least one mathematical equation empirically predicting one or more engine emissions as a function of at least two of the following properties of the unleaded fuel mixture: at least one of the component concentrations, the Reid Vapor Pressure; the initial boiling point; the 10% ASTM D-86 distillation point; the 50% ASTM D-86 distillation point, the aromatics content; and the Research, Motor, or (R+M/2) Octane number.

In another process embodiment, a process comprising blending at least one hydrocarbon stream boiling at ambient pressures within the range of about 300-340° F. (IBP) to about 650-750° F. (end point) at standard pressure conditions with a stream of ammonia, hydrazine, or other reducing component boiling at ambient pressures within the range of about −30° F. to about 240° F. at standard pressure conditions and a stream of a carrier component boiling within a range of about 70° F. to 212° F. at standard conditions to produce an fluid mixture suitable for combustion in a diesel engine powering a vehicle, said blending being controlled in accordance with at least one mathematical equation empirically predicting one or more engine emissions as a function of at least two of the following properties of the unleaded fluid mixture: first component concentration; the initial boiling point; the 90% ASTM D-975 distillation point; Cetane index; and the Cetane number.

If step-wise emission reductions over time are desired, step-wise inventive mixture property changes can be implemented along with selections of these properties based on mathematical calculations, e.g., increasing ammonia concentrations, decreasing RVP, decreasing 50% distillation points, decreasing aromatic content, and increasing cetane number or octane value. Thus, as the need for limiting one or more exhaust emissions changes, this may be achieved by selecting different fuel property limitations, perhaps in conjunction with apparatus changes to optimally use the selected fuel properties. As is known in the art, the specific values of mathematical factors, e.g., constants and the range of property limitations, may be based on the analysis of empirical emission data from one or more engines.

In addition to controlling emissions, the inventive process of selecting composition components for different processes and apparatus options/embodiments also allow composition blending to satisfy altitude, cold start, hot start, and other vehicle performance desires or constraints. Moreover, at least one of the components of the inventive mixture may be produced from non-crude oil sources, reducing the dependence on foreign oil supplies as well as increasing the potential uses of abundant domestic coal and agricultural waste supplies.

Although one or more preferred embodiments of the invention has been shown and described, and some alternative embodiments have also been shown and/or described, not all alternative embodiments and similar or equivalent apparatus, functions, and/or means for performing functions of the invention have been shown or described. Further changes and modifications may be made to the invention by those skilled in the art without departing from the spirit and scope of the invention, e.g., to adapt the invention to other applications or constraints.

As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential".

I claim as follows:

1. A method for reducing NOx emissions from a vehicle, said vehicle powered at least in part by an air-consuming combustion engine, said method comprising:
   transferring a fluid mixture from a fuel dispensing facility through a fill port to a vehicle storage vessel, said fluid mixture comprising a hydrocarbon component, an ammonia-like NOx reductant component and a NOx reductant carrier component, said ammonia-like NOx reductant component comprising nitrogen and hydrogen elements with no more than a minor amount of carbon;
   storing said fluid mixture on-board said vehicle in said vehicle storage vessel prior to operation of said vehicle;
   withdrawing at least a portion of said fluid mixture from said vehicle storage vessel;
   separating said portion of said fluid mixture into at least a first portion and a second portion wherein said first portion has a concentration of said ammonia-like NOx reductant component different from the concentration of said ammonia-like NOx reductant component of said second constituent portion;
   mixing at least some of said first portion with engine intake air to form a combustible mixture;
   combusting said combustible mixture in said air-consuming combustion engine resulting in an exhaust gas mixture being generated; and
   mixing at least some of said second portion with said exhaust gas mixture.

2. A method for reducing NOx emissions from a vehicle, said vehicle powered at least in part by an air-consuming combustion engine, said method comprising:
   transferring a fluid mixture from a fuel dispensing facility through a fill port to a vehicle storage vessel, said fluid mixture comprising a hydrocarbon component and an ammonia-like NOx reductant component and a NOx reductant carrier component, said ammonia-like NOx reductant component comprising nitrogen and hydrogen elements with no more than a minor amount of carbon;
   storing said fluid mixture on-board said vehicle in said vehicle storage vessel prior to operation of said vehicle;
   withdrawing at least a portion of said fluid mixture from said vehicle storage vessel;
   separating said portion of said fluid mixture into at least a first portion and a second portion wherein said first portion has a concentration of said ammonia-like NOx reductant component different from the concentration of said ammonia-like NOx reductant component of said second constituent portion;
   mixing at least some of said first portion with engine intake air to form a combustible mixture;
   combusting said combustible mixture in said air-consuming combustion engine resulting in an exhaust gas mixture being generated; and
   mixing at least some of said second portion with said exhaust gas mixture, wherein said ammonia-like NOx reductant component consists essentially of ammonia, said carrier component consists essentially of one or more alcohols.

3. The method of claim 2 which also comprises the step of contacting said exhaust gas mixture with a catalyst after the step of mixing at least some of said second portion.

4. The method of claim 2 which also comprises the step of increasing the concentration of said ammonia component in said second portion before the step of mixing at least some of said second portion with said exhaust gas mixture.

5. The method of claim 2 which also comprises the step of mixing at least some of said second portion with said engine intake air before said step of mixing at least some of said first portion with said engine intake air, wherein the combustion air/fuel ratio is typically greater than stoichiometric and has a Lambda value of at least about 1.03 over at least a substantial portion of the range of operating conditions of said air-consuming combustion engine.

6. The method of claim 2 wherein said air-consuming combustion engine is a diesel cycle engine and wherein at least some of said second portion is at less than atmospheric pressure prior to mixing with said engine intake air wherein said second portion mixing with said engine intake air does not initially form a combustible mixture with an initial air/fuel ratio being outside the flammability range.

7. The method of claim 2 which also comprises the step supplying at least some of said second portion to a use other than combusting or exhaust gas mixing.

8. A method of reducing at least one constituent of an exhaust gas mixture containing nitrogen oxides wherein said exhaust gas mixture is generated by a combustion engine on-board a vehicle, said method comprising:
   transferring a fluid mixture from a fuel dispensing facility through a fill port to a vehicle storage vessel wherein said fluid mixture contains a majority of hydrocarbon constituents;
   separating an ammonia-containing fluid from said transferred fluid mixture after said transferring to said vehicle; and
   adding at least some of said ammonia-containing fluid to said exhaust gas mixture forming a reduced exhaust gas mixture.

9. The method of claim 8 wherein said ammonia-containing fluid is primarily used as a generally liquid fuel for said combustion engine, wherein the ratio of the amount of ammonia constituent in said ammonia-containing fluid to the amount of nitrogen oxides within the exhaust gas is less than about 1.0-1.4, and wherein the method also comprises the step of contacting said reduced exhaust gas mixture with a catalyst.

10. A fluid mixture primarily for use as a generally liquid fuel in an internal combustion engine in a baseline vehicle that produces exhaust gases, said baseline vehicle having a means for stripping at least a portion of an ammonia-like NOx reductant component of said fluid mixture, a means for using the remainder of said fluid mixture as a fuel in said internal combustion engine, a means for injecting said portion into said exhaust gases, and a means for transferring said fluid mixture from a fuel dispensing facility to a vehicle storage vessel in said baseline vehicle, said fluid mixture having a first level of anti-knock properties and said fluid mixture comprising a hydrocarbon fluid component having a second level of anti-knock properties that less effective is controlling engine knock and that results in higher levels exhaust-gas NOx emissions when combusted by itself in said baseline internal combustion engine when compared to combusting said remainder of said fluid mixture, an ammonia-like NOx reductant component comprising at least about 0.01 percent by weight of the mixture, and a NOx reductant carrier component comprising at least about 5 percent of the weight of the mixture.

* * * * *